United States Patent
Koike et al.

(10) Patent No.: US 9,631,530 B2
(45) Date of Patent: Apr. 25, 2017

(54) WORK VEHICLE WITH CONTROLS FOR REGENERATING EXHAUST GAS PURIFICATION DEVICE

(71) Applicant: YANMAR CO., LTD., Osaka (JP)

(72) Inventors: Yuusuke Koike, Osaka (JP); Akimichi Iwata, Osaka (JP); Kazuhisa Yokoyama, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/914,317

(22) PCT Filed: Aug. 29, 2014

(86) PCT No.: PCT/JP2014/072702
§ 371 (c)(1),
(2) Date: Feb. 25, 2016

(87) PCT Pub. No.: WO2015/030160
PCT Pub. Date: Mar. 5, 2015

(65) Prior Publication Data
US 2016/0208665 A1    Jul. 21, 2016

(30) Foreign Application Priority Data

Aug. 29, 2013  (JP) ................... 2013-178596

(51) Int. Cl.
*B62D 49/00*    (2006.01)
*F01N 3/023*    (2006.01)
(Continued)

(52) U.S. Cl.
CPC .............. *F01N 3/023* (2013.01); *B62D 49/00* (2013.01); *F01N 9/002* (2013.01); *F02D 41/029* (2013.01);
(Continued)

(58) Field of Classification Search
CPC ........ B62D 49/00; F01N 9/002; F01D 41/029
See application file for complete search history.

(56) References Cited

U.S. PATENT DOCUMENTS

| 8,549,843 B2 * | 10/2013 | Hagio ................ B01D 53/9495 60/286 |
| 2010/0275580 A1 * | 11/2010 | Abraham ................ F01N 9/002 60/274 |

FOREIGN PATENT DOCUMENTS

| JP | 2005-127206 | 5/2005 |
| JP | 2008-031955 | 2/2008 |
| JP | 2009-257323 | 11/2009 |

\* cited by examiner

*Primary Examiner* — John Walters
*Assistant Examiner* — James Triggs
(74) *Attorney, Agent, or Firm* — Norris McLaughlin & Marcus, P.A.

(57) ABSTRACT

Regarding a work vehicle that includes an engine mounted on a travelling machine body and an exhaust gas purification device arranged in an exhaust gas path of the engine, it is an object to prevent the regeneration control of the exhaust gas purification device from being executed against operators' will. The work vehicle of the present invention includes a regeneration switch 329 for executing the regeneration control of an exhaust gas purification device 50, a meter panel 246 for displaying the situation of driving operations of a travelling machine body 2, and a work device 15. Then, when it is assumed that a predetermined amount or more of particulate matter in the exhaust gas purification device 50 is accumulated, the meter panel 246 notifies a regeneration control request warning and displays characters that urge stoppages of work of the work device 15 and travelling of the travelling machine body 2.

4 Claims, 16 Drawing Sheets

(51) Int. Cl.
*F02D 41/02* (2006.01)
*F01N 9/00* (2006.01)
F01N 3/035 (2006.01)
F02D 41/40 (2006.01)
F02D 41/22 (2006.01)

(52) U.S. Cl.
CPC .......... *F01N 3/035* (2013.01); *F01N 2590/08* (2013.01); *F02D 41/405* (2013.01); *F02D 2041/228* (2013.01); *F02D 2200/604* (2013.01)

Fig. 14

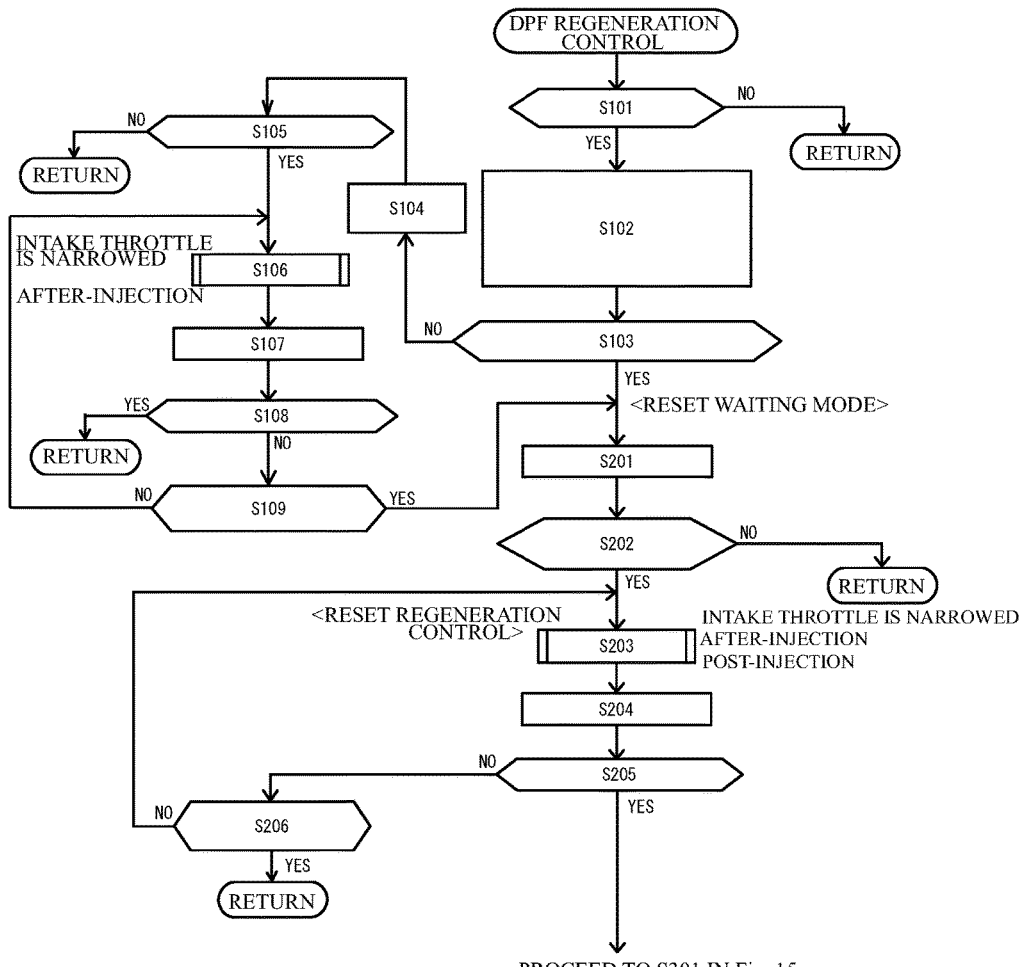

PROCEED TO S301 IN Fig. 15

- S101 KEY SWITCH IS TURNED ON ?
- S102 ENGINE ROTATION SENSOR VALUE
  COOLANT TEMPERATURE SENSOR VALUE
  OPEN DEGREE OF INTAKE THROTTLE
  DIFFERENTIAL PRESSURE SENSOR VALUE, OPEN DEGREE OF EGR VALVE
  DPF TEMPERATURE SENSOR VALUE
  FUEL INJECTION AMOUNT, READ-IN
- S103 TI (CUMULATIVE DRIVE TIME) ≥ TI1 ?
- S104 AMOUNT OF PM ACCUMULATION IS CALCULATED
- S105 AMOUNT OF PM ACCUMULATION ≥ Ma ?
- S106 ASSIST REGENERATION
- S107 AMOUNT OF PM ACCUMULATION IS CALCULATED
- S108 AMOUNT OF PM ACCUMULATION ≤ Ma ?
- S109 HAS TIME TI4 PASSED WITH AMOUNT OF PM ACCUMULATION ≥ Ma ?
- S201 RESET REGENERATION REQUEST
- S202 REGENERATION SW IS TURNED ON ?
- S203 RESET REGENERATION
- S204 AMOUNT OF PM ACCUMULATION IS CALCULATED
- S205 AMOUNT OF PM ACCUMULATION ≥ Mr ?
- S206 HAS TIME TI8 PASSED ?

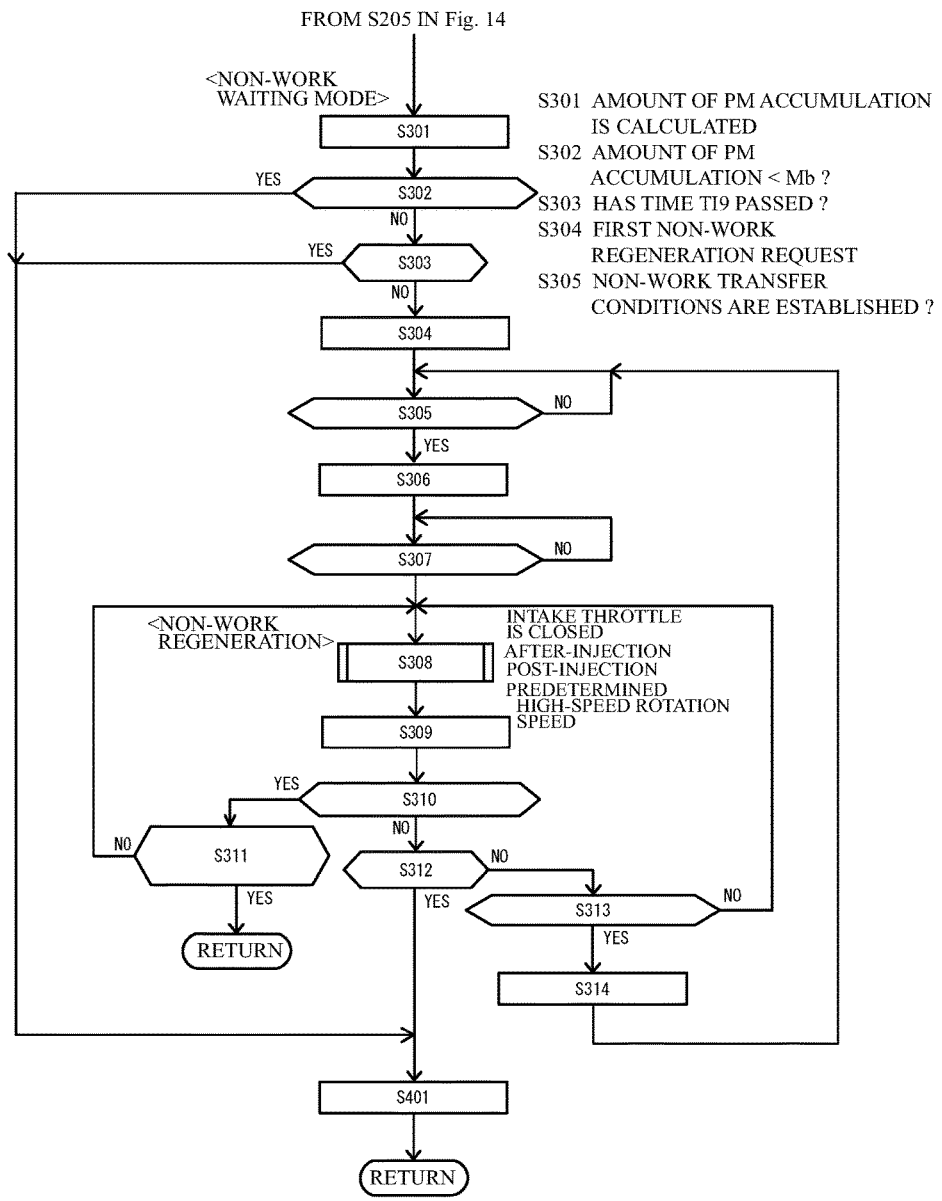

Fig.15

S301 AMOUNT OF PM ACCUMULATION IS CALCULATED
S302 AMOUNT OF PM ACCUMULATION < Mb ?
S303 HAS TIME TI9 PASSED ?
S304 FIRST NON-WORK REGENERATION REQUEST
S305 NON-WORK TRANSFER CONDITIONS ARE ESTABLISHED ?
S306 SECOND NON-WORK REGENERATION REQUEST
S307 REGENERATION SWITCH IS TURNED ON ?
S308 NON-WORK REGENERATION
S309 AMOUNT OF PM ACCUMULATION IS CALCULATED
S310 AMOUNT OF PM ACCUMULATION < Ms ?
S311 HAS TIME TI11 PASSED ?
S312 HAS TIME TI12 PASSED ?
S313 NON-WORK TRANSFER CONDITIONS ARE NOT ESTABLISHED ?
S314 NON-WORK REGENERATION IS INTERRUPTED
S401 FILTER ABNORMALITY WARNING

WORK VEHICLE WITH CONTROLS FOR REGENERATING EXHAUST GAS PURIFICATION DEVICE

TECHNICAL FIELD

The present invention of the instant application relates to a work vehicle, such as an agricultural work vehicle, in which an exhaust gas purification device is mounted on the side of an upper portion of an engine.

BACKGROUND OF THE INVENTION

These days, with the application of high-level emission control regarding diesel engines (hereinafter merely referred to an engine), it has been demanded that an exhaust gas purification device for purifying and treating air pollution substances in exhaust gas is mounted in agricultural work vehicles or construction work machines in which an engine is mounted. As the exhaust gas purification device, a diesel particulate filter (the exhaust gas purification device) for collecting particulate matter and the like in the exhaust gas has been known (for example, see Patent Literature 1).

PATENT LITERATURE

PTL1: Japanese Unexamined Patent Application Publication No. 2008-31955

SUMMARY OF THE INVENTION

As the work vehicle in Patent Literature 1, regarding the work vehicle in which the engine including the exhaust gas purification device is mounted, a distance from an exhaust manifold is shortened, thereby suppressing a reduction in temperature of exhaust gas in the exhaust gas purification device. However, when the engine has been continuously operated under low load for many hours, the temperature of the exhaust gas is reduced, so that particulate matter (PM) are accumulated in the exhaust gas purification device, and the purification capacity of the exhaust gas purification device is reduced.

Accordingly, conventionally, there is a case where regeneration control, in which the temperature of the exhaust gas is raised by use of an increase in engine load, is performed, and the regeneration control is automatically executed. However, when the regeneration control is automatically executed, the engine is automatically driven in a high-load state, and when work is conducted under low load, not only the engine behaves against an operator's will, but also driving troubles occur in the engine or a work machine. Also, in some cases, a travelling machine body or the work machine of the work vehicle needs to be stopped due to the regeneration control, and there is a case where the operator cannot determine operations that are actually required, through the mere request of the execution of the regeneration control.

Accordingly, it is a technical object of the present invention to provide a work vehicle, in which improvements are provided in the light of the current circumstances.

The present invention is such that a work vehicle may include an engine mounted on a travelling machine body, a driving operation display device for displaying a driving operation situation of the travelling machine body, an exhaust gas purification device arranged in an exhaust gas path of the engine, and a work device mounted on the travelling machine body, and configured to be capable of executing regeneration control, in which particulate matter in the exhaust gas purification device is removed, based on a manual operation of a regeneration switch, and wherein when it is assumed that a predetermined amount or more of particulate matter in the exhaust gas purification device is accumulated, the driving operation display device notifies a regeneration control request warning and displays characters that urge stoppages of work of the work device and travelling of the travelling machine body.

Regarding the work vehicle, the present invention is such that when regeneration transfer conditions for starting the regeneration control are not satisfied, incomplete conditions out of the regeneration transfer conditions are displayed with characters on the driving operation display device.

Regarding the work vehicle, the present invention is such that when the regeneration transfer conditions are satisfied, the driving operation display device gives display urging an operation of the regeneration switch.

Regarding the work vehicle the present invention is such that the work vehicle further includes an engine controller configured to control drive of the engine; and a driving operation display controller configured to control a display operation of the driving operation display device, and wherein the controllers are electrically connected to each other, and wherein only when the driving operation display controller verifies reception of the manual operation by means of the regeneration switch after the regeneration control request warning is displayed by the driving operation display device, the driving operation display controller gives the engine controller a command for executing the regeneration control of the exhaust gas purification device.

According to the present invention of the instant application, the work vehicle is configured to include the engine mounted on the travelling machine body, the driving operation display device for displaying the driving operation situation of the travelling machine body, the exhaust gas purification device arranged in the exhaust gas path of the engine, and the work device mounted on the travelling machine body, and configured to be capable of executing regeneration control, in which particulate matter in the exhaust gas purification device is removed, based on the manual operation of the regeneration switch, and wherein when it is assumed that a predetermined amount or more of particulate matter in the exhaust gas purification device is accumulated, the driving operation display device notifies the regeneration control request warning and displays the characters that urge the stoppages of work of the work device and the travelling of the travelling machine body, so that the operator can easily verify the reason for the regeneration control request warning, and the regeneration control operation of the exhaust gas purification device is rapidly executed based on the manual operation by the operation, and the exhaust gas purification device is appropriately regenerated.

According, to the invention, it is configured such that when regeneration transfer conditions for starting the regeneration control are not satisfied, incomplete conditions out of the regeneration transfer conditions are displayed with characters on the driving operation display device, so that the operator can easily verify the incomplete contents of regeneration. Accordingly, the operator performs various operations in accordance with the verified incomplete contents of regeneration, thereby smoothly starting the regeneration of the exhaust gas purification device.

According to the invention, it is configured such that when the regeneration transfer conditions are satisfied, the driving operation display device gives display urging an operation of the regeneration switch, so that the operator can verify that the regeneration transfer conditions are satisfied and clearly determine a timing in operating the regeneration switch. Also, when the regeneration switch is not turned on, that is, when the operator has no intension, the regeneration control is not executed, so that the operator can assume in advance an impact due to variation of torque or change in engine sound, and the operator can avoid having a sense of incongruity that is attributed to the regeneration control.

According to the invention, it is configured such that the work vehicle further includes the engine controller to control drive of the engine, and the driving operation display controller to control the display operation of the driving operation display device, and wherein the controllers are electrically connected to each other, and wherein only when the driving operation display controller verifies the reception of the manual operation by means of the regeneration switch after the regeneration control request warning is displayed by the driving operation display device, the driving operation display controller gives the engine controller a command for executing the regeneration control of the exhaust gas purification device, so that each regeneration control can be executed without difficulties while the load applied to the engine controller is alleviated. Furthermore, the regeneration switch can be assembled into the driving operation display controller. Accordingly, the regeneration switch can be arranged at low costs without particularly increasing the number of controllers and providing the regeneration switches.

BRIEF DESCRIPTION OF THE DRAWINGS

FIG. 14 is a flowchart of assist regeneration control and reset regeneration control.
FIG. 15 is a flowchart of non-work regeneration control.

DESCRIPTION OF PREFERRED EMBODIMENTS

Figure 1:
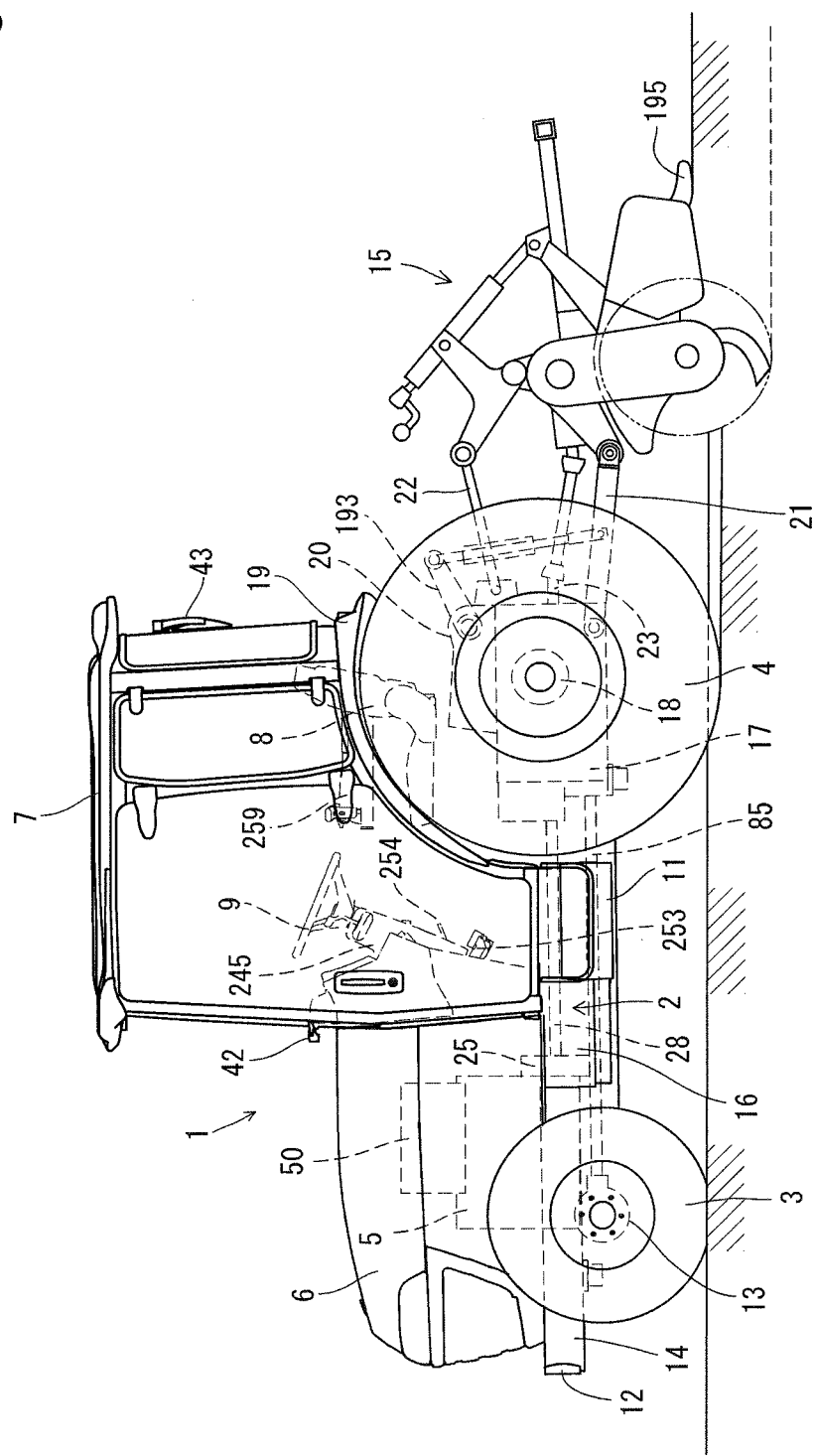
FIG. 1 is a left side view of a tractor.

Hereinafter, an embodiment, in which the present invention is embodied, will be described based on drawings and exemplified by a tractor as an agricultural work vehicle.

To begin with, the outline of the tractor will be described referring to FIGS. 1 and 2. A travelling machine body 2 of a tractor 1 of the present embodiment is supported by a pair of right and left front wheels 3 as a travelling unit and a pair of right and left rear wheels 4 in a similar manner. It is constituted such that the rear wheels 4 and the front wheels 3 are driven by a common-rail diesel engine 5 (hereinafter merely referred to as an engine) as a power source mounted on the front portion of the travelling machine body 2, which allows the tractor 1 to move forward and backward in running. The engine 5 is covered with a hood 6. A cabin 7 is arranged on the upper surface of the travelling machine body 2, and a maneuvering seat 8 and a steering handle (round handle) 9 that moves the steering direction of the front wheels 3 to the right and left by means of steering are arranged in the interior of the cabin 7. A fuel tank 11 for supplying fuel to the engine 5 is provided on the lower side with respect to the bottom portion of the cabin 7. It is noted that for convenience' sake, the illustration of the cabin is omitted in FIG. 2.

The travelling machine body 2 is constituted by an engine frame 14 that includes a front bumper 12 and a front axle case 13, and right and left machine body frames 16 that are detachably fixed with bolts on the rear portion of the engine frame 14. A mission case 17 that appropriately shifts the rotational power from the engine 5 and transmits the power to the front wheels 3 and the rear wheels 4 is installed in the rear portion of the machine body frames 16. The rear wheels 4 are mounted on the mission case 17 via a rear axle case 18 that is mounted in such a manner as to externally protrude from the outer-side surface of the mission case 17. Sections above the right and left rear wheels 4 are covered with fenders 19 fixed on the machine body frames 16.

A hydraulic hoisting and lowering mechanism 20 for hoisting and lowering a rotary cultivator 15, as a work portion, is detachably mounted on the upper surface of the rear portion of the mission case 17. The rotary cultivator 15 is coupled with the rear portion of the mission case 17 via a three-point linkage mechanism made up of a pair of right and left lower links 21 and a top link 22. A PTO shaft 23 for transmitting a PTO drive force to the rotary cultivator 15 is installed backward in a protruding manner on the rear side surface of the mission case 17.

Figure 3:
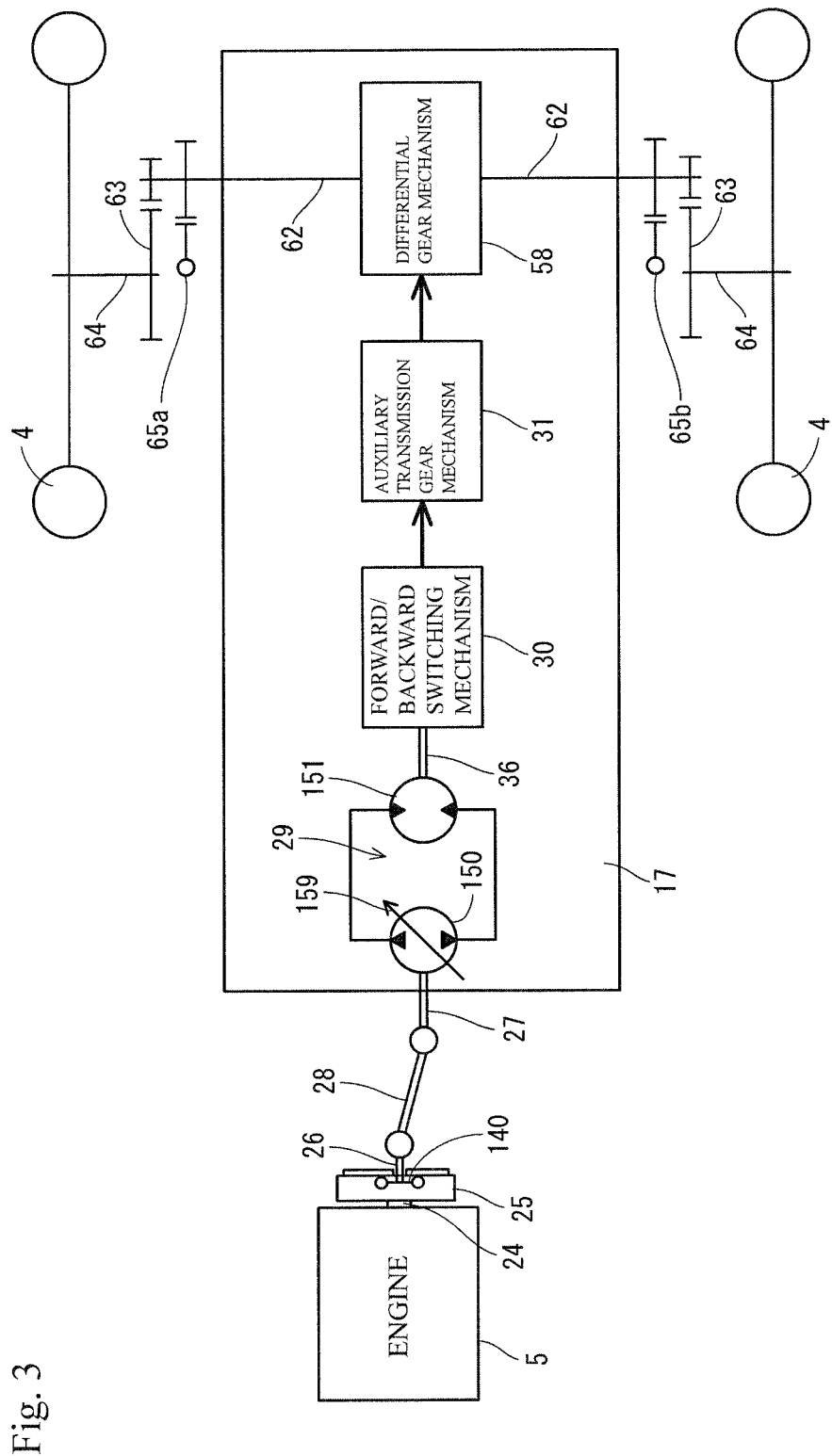
FIG. 3 is a block diagram illustrating the outline of a power transmission system.

As illustrated in FIG. 3, a flywheel 25 is mounted in such a manner as to be directly linked to an engine output shaft 24 that is installed backward in a protruding manner on the rear side surface of the engine 5. A main driving axle 26 that is coupled via the flywheel 25 and a main clutch 140 and extended backward is coupled with a main transmission input shaft 27 installed forward in a protruding manner on the mission case 17 via a stretchable, contractible power transmission shaft 28 that includes universal couplings on both ends thereof. In contrast, as illustrated in FIG. 1, a front wheel transmission shaft (not illustrated) that protrudes backward from the front axle case 13, and a front wheel output shaft (not illustrated) that protrudes forward from the front side surface of the mission case 17 are coupled via a front wheel driving shaft 85.

Also, a hydraulic continuously variable transmission 29, a forward/backward switching mechanism 30, a travelling auxiliary transmission gear mechanism 31, and a differential gear mechanism 58 are arranged in the mission case 17. The rotational power of the engine 5 is transmitted to the main transmission input shaft 27 of the mission case 17 via the power transmission shaft 28 and then appropriately shifted by the hydraulic continuously variable transmission 29 and the travelling auxiliary transmission gear mechanism 31. This shifted power is transmitted to the right and left rear wheels 4 via the differential gear mechanism 58. Also, the aforementioned shifted power is transmitted to the front axle case 13 via the front wheel driving shaft 85, thereby transmitting the shifted power to the right and left front wheels 3.

The hydraulic continuously variable transmission 29 is of an inline type in which a main transmission output shaft 36 is concentrically arranged on the main transmission input shaft 27, and the hydraulic continuously variable transmission 29 includes a variable displacement hydraulic pump unit 150 and a fixed displacement transmission hydraulic motor unit 151 that is operated by high-pressure hydraulic oil discharged from the hydraulic pump unit 150. A pump cam plate 159 that can change an inclination angle with respect to the axis line of the main transmission input shaft 27 and adjust the amount of hydraulic oil supplied is provided in the hydraulic pump unit 150. The pump cam plate 159 is associated with the main transmission hydraulic cylinder that changes and adjusts the inclination angle of the pump cam plate 159 with respect to the axis line of the main transmission input shaft 27. The inclination angle of the pump cam plate 159 is changed by the drive of the main transmission hydraulic cylinder (not illustrated), which changes and adjusts the amount of hydraulic oil supplied from the hydraulic pump unit 150 to the hydraulic motor unit 151, and the main transmission operation of the hydraulic continuously variable transmission 29 is performed.

That is, when a switching valve (not illustrated) is operated by the hydraulic oil from a proportional control valve 123 (see FIG. 12) that is operated in proportion to the manipulated variable of a main transmission lever 290 (described later in detail), the main transmission hydraulic cylinder not illustrated is driven, and in step with this, the inclination angle of the pump cam plate 159 with respect to the axis line of the main transmission input shaft 27 is changed. The pump cam plate 159 of the embodiment is such that an angle can be adjusted in a range between one (positive) maximum inclination angle and the other (negative) maximum inclination angle, including a neutral angle of the inclination of approximately zero degrees (prior to and subsequent to zero and inclusive of zero), and the angle is set, when the vehicle speed of the travelling machine body 2 is lowest, in such a manner as to form an angle inclined to any one of the angles (in this case, an inclination angle is negative and in the neighborhood of the maximum).

When the inclination angle of the pump cam plate 159 is approximately zero (neutral angle), the hydraulic motor unit 151 is not driven by the hydraulic pump unit 150, and a main transmission output shaft 237 rotates at approximately the same rotational speed as that of the main transmission input shaft 27. When the pump cam plate 159 is inclined on the side of one direction (positive inclination angle) with respect to the axis line of the main transmission input shaft 27, the hydraulic pump unit 150 operates the hydraulic motor unit 151 in such a manner as to accelerate, and the main transmission output shaft 36 rotates at a rotational speed higher than that of the main transmission input shaft 27. As a result, the rotational speed of the hydraulic motor unit 151 is added to the rotational speed of the main transmission input shaft 27, which is transmitted to the main transmission output shaft 36. Accordingly, transmission power (vehicle speed) from the main transmission output shaft 36 is changed in proportion to the inclination angle (positive inclination angle) of the pump cam plate 159 in a range of the rotational speed that is higher than the rotational speed of the main transmission input shaft 27. When the inclination angle of the pump cam plate 159 is positive and in the neighborhood of the maximum inclination angle, the vehicle speed of the travelling machine body 2 reaches the maximum.

When the pump cam plate 159 is inclined on the side of the other direction (negative inclination angle) with respect to the axis line of the main transmission input shaft 27, the hydraulic pump unit 150 operates the hydraulic motor unit 151 in such a manner as to decelerate (reversely rotate), and the main transmission output shaft 36 rotates at a rotational speed lower than that of the main transmission input shaft 27. As a result, the rotational speed of the hydraulic motor unit 151 is subtracted from the rotational speed of the main transmission input shaft 27, which is transmitted to the main transmission output shaft 36. Accordingly, the transmission power from the main transmission output shaft 36 is changed in proportion to the inclination angle (negative inclination angle) of the pump cam plate 159 in a range of the rotational speed that is lower than the rotational speed of the main transmission input shaft 27. When the inclination angle of the pump cam plate 159 is negative and in the neighborhood of the maximum inclination angle, the vehicle speed of the travelling machine body 2 reaches the minimum.

The forward/backward switching mechanism 30 receives the rotational power from the main transmission output shaft 36 of the hydraulic continuously variable transmission 29. The forward/backward switching mechanism 30 includes a forward gear (not illustrated) and a backward gear (not illustrated), which are used for switching forward and backward movements of the travelling machine body 2, and the forward gear and the backward gear are alternatively selected and rotated by forward and backward hydraulic clutches (not illustrated), thereby transmitting power to the auxiliary transmission gear mechanism 31. In this time, in a neutral state where a forward/backward switching lever (reverse lever) 252 is not under any tilting operations, any of the forward and backward hydraulic clutches not illustrated is brought into a state where the power is blocked. It is constituted such that the rotational power transmitted from the main transmission output shaft 36 to the front wheels 3 and the rear wheels 4 becomes approximately zero (in the same state as the disengagement of the main clutch 140).

Also, a forward clutch electromagnetic valve 46 (see FIG. 12) is driven by the forward side tilting operation of the forward/backward switching lever 252 (see FIGS. 1 and 2), thereby operating a forward clutch cylinder (not illustrated). Accordingly, the rotational power of the main transmission output shaft 36 is transmitted to the auxiliary transmission gear mechanism 31 via the forward gear not illustrated in the forward/backward switching mechanism 30. In contrast, a backward clutch electromagnetic valve 48 (see FIG. 12) is driven by the backward side tilting operation of the forward/backward switching lever 252, thereby operating a backward clutch cylinder (not illustrated). Accordingly, the rotational power of the main transmission output shaft 36 is transmitted to the auxiliary transmission gear mechanism 31 via the backward gear not illustrated in the forward/backward switching mechanism 30.

The auxiliary transmission gear mechanism 31 receives the rotational power from the forward/backward switching mechanism 30, shifts the rotational power by way of the forward/backward switching mechanism 30, and outputs the power. The auxiliary transmission gear mechanism 31 includes a low-speed gear (not illustrated) and a high-speed gear (not illustrated) for auxiliary transmission, and the low-speed gear and the high-speed gear are alternatively selected and rotated by a low-speed clutch (not illustrated) and a high-speed clutch (not illustrated), thereby shifting the rotational power from the forward/backward switching mechanism 30 and transmitting power to each mechanism in subsequent stages.

Figure 12:
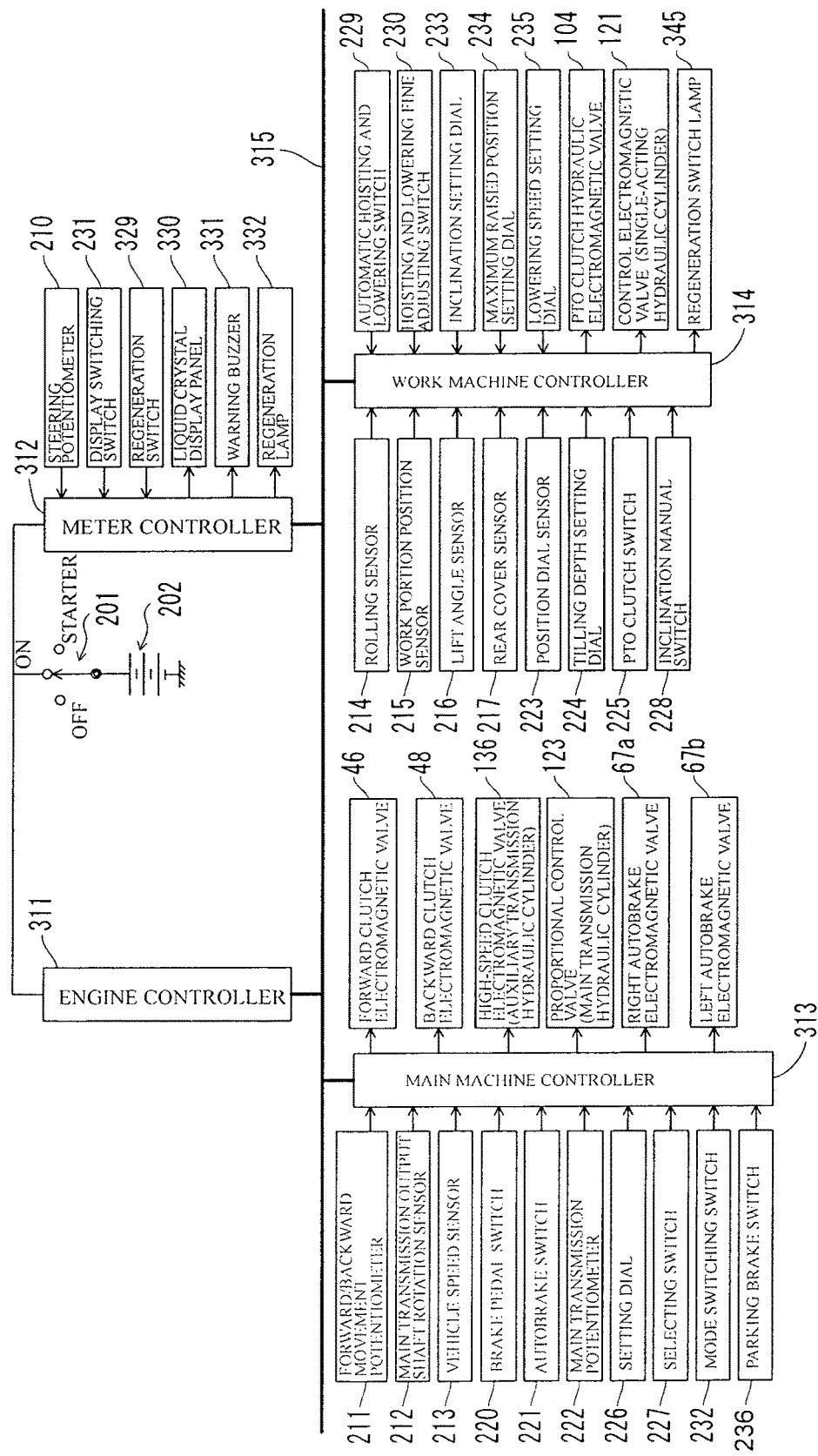
FIG. 12 is a functional block diagram of controllers.

The position of a piston rod of an auxiliary transmission hydraulic cylinder (not illustrated) is displaced on the low-speed side by the low-speed side tilting operation of an auxiliary transmission lever 258 (see FIGS. 1 and 2) in accordance with the switching operation of a high-speed clutch electromagnetic valve 136 (see FIG. 12). Accordingly, an auxiliary transmission shifter (not illustrated) coupled with the tip end of the piston rod of the auxiliary transmission hydraulic cylinder (not illustrated) brings the low-speed clutch not illustrated into a power connection state, shifts the rotational power from the forward/backward switching mechanism 30 to a low speed, and transmits the power to the differential gear mechanism 58.

In contrast, the position of the piston rod of the auxiliary transmission hydraulic cylinder (not illustrated) is displaced on the high-speed side by the high-speed side tilting operation of the auxiliary transmission lever 258 in accordance with the switching operation of the high-speed clutch electromagnetic valve 136 (see FIG. 12). Accordingly, the auxiliary transmission shifter (not illustrated) brings the high-speed clutch not illustrated into a power connection state, shifts the rotational power from the forward/backward switching mechanism 30 to a high speed, and transmits the power to the differential gear mechanism 58.

The differential gear mechanism 58 receives the rotational power from the auxiliary transmission gear mechanism 31 and transmits the transmission power, shifted by the auxiliary transmission gear mechanism 31, to the right and left rear wheels 4. In this time, the differential gear mechanism 58 allocates and transmits the transmission power, shifted by the auxiliary transmission gear mechanism 31, to differential output shafts 62 extended in the right and left directions by means of differential gears (not illustrated) (differential operation). Then, the differential output shafts 62 are coupled with rear axles 64 via a final gear 63 and the like, and the rear wheels 4 are mounted on the tip end portions of the rear axles 64. Also, brake actuating mechanisms 65*a* and 65*b* are provided in association with the differential output shafts 62, and it is constituted such that the brake actuating mechanisms 65*a* and 65*b* are damped by the depressing operation of a brake pedal 251 (see FIG. 2) disposed on the right side of a steering column 245.

Furthermore, when the steering angle of the steering handle 9 (see FIGS. 1 and 2) forms a predetermined angle or larger, it is constituted that a brake cylinder (not illustrated) is actuated by the drive of an autobrake electromagnetic valve 67*a* (67*b*) corresponding to the rear wheels 4 on the inner side during rotation, and the brake actuating mechanism 65*a* (65*b*) corresponding to the rear wheels 4 on the inner side during rotation is automatically damped. Accordingly, this makes it possible to make sharp turns such as a U-turn in travelling rotationally. Also, the differential gear mechanism 58 includes a differential lock mechanism (not illustrated) for stopping the aforementioned differential operation (driving the right and left differential output shafts 62 with uniform velocity at all times). In this case, it is constituted such that a lock pin provided in a freely insertable manner is engaged with the differential gear by the depressing operation of a differential lock pedal 257 (see FIG. 2), which causes the differential gear to be fixed, stops a differential function, and drivingly rotates the right and left differential output shafts 62 with uniform velocity.

Also, the mission case 17 having the aforementioned constitution includes a PTO transmission gear mechanism (not illustrated) for switching the driving speed of the PTO shaft 23 and a PTO clutch (not illustrated) for engaging and disengaging the transmission of power between the PTO transmission gear mechanism and the main transmission input shaft 27, in the interior thereof. The power from the engine 5 is transmitted to the PTO shaft 23 by the operations of the PTO transmission gear mechanism and the PTO clutch.

In this case, when a PTO clutch switch 225 described later is operated and engaged, the PTO clutch not illustrated is brought into a power connection state by the drive of a PTO clutch hydraulic electromagnetic valve 104 (see FIG. 12). As a result, the rotational power from the engine 5, which is transmitted through the main transmission input shaft 27, is output from the PTO transmission gear mechanism not illustrated to the PTO shaft 23. In this time, when a PTO transmission lever 256 is shifted, a plurality of gears in the PTO transmission gear mechanism not illustrated are alternatively rotated and operated, thereby transmitting each PTO transmission output, at the first to fourth speeds and reverse rotation, to the PTO shaft 23.

The maneuvering seat 8 and its peripheral structure will be described referring to FIGS. 4 and 5. The steering column 245 that surrounds the rear portion side of the engine 5 is arranged in front of the maneuvering seat 8 in the cabin 7. The steering handle 9, which is formed in an approximately circular shape when viewed from a plane, is mounted on the upper end of a handle shaft protruded from the upper surface of the steering column 245. Accordingly, an approximately annular steering wheel 247 of the steering handle 9 is positioned in such a manner as to be inclined obliquely downward in the rear with respect to the horizontal direction.

A throttle lever 250 for setting and holding the number of output revolutions of the engine 5 and the pair of right and left brake pedals 251 for damping and operating the travelling machine body 2 are arranged on the right side of the steering column 245. The forward/backward switching lever (reverse lever) 252 for switching the advancing direction of the travelling machine body 2 to the forward or backward direction and a clutch pedal 253 for actuating the disengagement of the main clutch 140 for power engagement and disengagement are arranged on the left side of the steering column 245. A parking brake lever 254 for holding the right and left brake pedals 251 at depressing positions is arranged on the rear surface side of the steering column 245.

Then, an operational error preventing body (reverse guard) 261 for covering the forward/backward switching lever 252 from the lower side is installed in a protruding manner from the steering column 245 on the left side of the steering column 245 below the forward/backward switching lever 252. The operational error preventing body 261 is arranged below the forward/backward switching lever 252, which prevents an operator from contacting the forward/backward switching lever 252 when the operator gets on or off the work vehicle.

An accelerator pedal 255 for accelerating and decelerating the engine revolutions, in a range that is equal to or wider than a range where the engine revolutions set by the throttle lever 250 is the minimum revolutions, is arranged on the right side of the steering column 245 on abase plate 248 in the cabin 7. The PTO transmission lever 256 for performing switching operation of the driving speed of the PTO shaft 23 described later and the differential lock pedal 257 for executing the operation of drivingly rotating the right and left rear wheels 4 with constant velocity are arranged below the maneuvering seat 8. The auxiliary transmission lever 258 for switching the output range of the travelling auxiliary transmission gear mechanism 30 (see FIG. 3) to the low speed and high speed is arranged on the left side of the maneuvering seat 8.

An arm rest 259 for placing the arm or elbow of the operator who sits on the maneuvering seat 8 is provided on the right side of the maneuvering seat 8. The arm rest 259 is constituted as an individual body separated from the maneuvering seat 8 and includes the main transmission lever 290 as a travelling operating means and a work portion position dial (hoisting and lowering dial) 300 as a work operating means. The main transmission lever 290 is provided so as to be capable of performing forward and backward tiling operations as a main transmission operating body. Then, in the present embodiment, when the main transmission lever 290 is operated in such a manner as to be tilted forward, the vehicle speed of the travelling machine body 2 increases, whereas when the main transmission lever 290 is operated in such a manner as to be tilted backward, the vehicle speed of the travelling machine body 2 decreases. The work portion position dial 300 is of a dial type for manually changing and adjusting the height position of the rotary cultivator 15.

The lower-end rear portion of the arm rest 259, for example, is pivotally fitted in an undulating (up and down), rotatable manner and jumped up in a rotatable manner with respect to a bracket (not illustrated) installed in a standing manner on a sheet frame (not illustrated) and the like, on which the maneuvering seat 8 is placed. The arm rest 259 is constituted such that the rotational posture during undulating rotation can be adjusted in plural steps (four steps in the embodiment). Noted that, it may be constituted that the arm rest 259 is separately independent from the front and rear slides of the maneuvering seat 8, and the position of the arm rest 259 can be adjusted (can be slid forward and backward) along the advancing direction (forward and backward direction) of the travelling machine body 2.

When the aforementioned undulating rotatable constitution is employed, the rotational posture of the arm rest 259 can be adjusted in a stepwise manner in accordance with the frame or working posture of an operator who sits on the maneuvering seat 8, so that the arm rest 259 can adequately support the arm of the operator or be set so as not to bump into the knees. Also, when the arm rest 259 has constitution in which the positions of the front and rear slides can be adjusted, the aforementioned constitution is effective in reducing the fatigue of the operator due to long hours of work, combined with the function of adjusting the positions of the front and rear slides of the maneuvering seat 8 or the constitution in which the arm rest 259 can be rotated in an undulating manner.

Furthermore, an operating stand 260 on which various operating means are provided is fixed above the fender 19 on the right side of the arm rest 259. Then, a tilling depth setting dial 224, a PTO clutch switch 225, and an inclination manual switch 228 are arranged on the upper surface of the operating stand 260. The tilling depth setting dial 224 is of a dial type for setting in advance a target tilling depth of the rotary cultivator 15. The PTO clutch switch 225 is used to engage or disengage a PTO clutch 100 and perform the engaging/disengaging operation of the transmission of power from the PTO shaft 23 to the rotary cultivator 15. The inclination manual switch 228 manually changes and adjusts the right and left inclination angles of the rotary cultivator 15.

The PTO clutch switch 225 is a push switch, and when the switch is turned clockwise in a plane view while being pressed down once, the switch is locked at a position where the switch is pressed down and brings the transmission of power from the PTO shaft 23 to the rotary cultivator 15 into a connection state, and when the switch is further pressed down once, the switch is returned to its original position and brings the transmission of power from the PTO shaft 23 to the rotary cultivator 15 into a cut-off state. The inclination manual switch 228 is a self-reset type (momentary type) lever switch for tilting in the right-and-left direction, and only when the inclination manual switch 228 is operated, the right-and-left inclination angle of the rotary cultivator 15 is varied.

The arm rest 259 includes a base portion (arm rest rear portion) 281 elongated back and forth and an extension portion (arm rest front portion) 282 extended from the base portion 281 to the front. The extension portion 282 is arranged and bent in the direction (the right direction in the embodiment) of being separated from the maneuvering seat 8 with respect to the base portion 281 extended in such a manner as to be disposed side by side in parallel to the maneuvering seat 8, and the arm rest 259 is formed in a mode of an approximately doglegged shape as a whole when viewed from a plane.

The arm rest 259 includes a front notch portion 283 that is depressed downward from the upper surface on the side of the maneuvering seat 8 of the front end of the extension portion 282, and the main transmission lever 290 is installed in a protruding manner on the upper surface of the front notch portion 283. The extension portion 282 includes a stepped portion 284 that is depressed downward from the upper surface on the side of the maneuvering seat 8 in rear (the connection side of the base portion 281) of the front notch portion 283, and a revolutions/vehicle-speed setting dial (setting dial) 226 described later and a revolutions/vehicle-speed selecting switch (selecting switch) 227 described later are arranged on the upper surface of the stepped portion 284.

It is noted that the height position of the upper surface of the stepped portion 284 is higher than the position of the upper surface of the front notch portion 283 and lower than the position of the upper surface of the base portion 281. Accordingly, even when the operator rests his arm or elbow on the base portion 281 of the arm rest 259 and operates the main transmission lever 290 in front of the extension portion 282, the risk of inadvertently contacting the setting dial 226 and the selecting switch 227 of the stepped portion 284 can be reduced. Consequently, operational errors of the setting dial 226 and the selecting switch 227 can be reduced or prevented to a great extent.

The revolutions/vehicle-speed setting dial 226 sets in advance the maximum rotation speed of the engine 5 or the maximum travelling speed of the travelling machine body 2. The revolutions/vehicle-speed selecting switch 227 assigns a value set by the revolutions/vehicle-speed setting dial 226 to any of the maximum rotation speed of the engine 5 or the maximum travelling speed of the travelling machine body 2, and is constituted of a position-holding-type (alternate type) switch (a position-holding-type rocker switch in the example of the present embodiment). Accordingly, when the rotation speed is assigned by the revolutions/vehicle-speed selecting switch 227, the maximum rotation speed of the engine 5 is set by the revolutions/vehicle-speed setting dial 226. In contrast, when the travelling speed is assigned by the revolutions/vehicle-speed selecting switch 227, the maximum travelling speed of the travelling machine body 2 is set by the revolutions/vehicle-speed setting dial 226.

Regarding the base portion 281 of the arm rest 259, a switch box 286 is embedded on the side of the maneuvering seat 8 in the rear. The upper surface of the switch box 286 includes an upper surface lid that opens to the reverse side of the maneuvering seat 8. The switch box 286 is normally in a state where the upper surface lid is closed, and the height of the upper surface of the upper surface lid corresponds to the height of the upper surface of the base portion 281 of the arm rest 259, and the operator rests his arm or elbow on the upper surface lid. Also, the switch box 286 includes an inclination setting dial 233, a maximum raised position setting dial 234, and a lowering speed setting dial 235. That is, when the upper surface lid is opened, respective setting dials 233 to 235 are arranged in a row on the upper surface on the inner side of the switch box 286. The inclination setting dial 233 sets in advance a relative, target right-and-left inclination angle of the rotary cultivator 15 with respect to the travelling machine body 2. The maximum raised position setting dial 234 sets the maximum raised position of the rotary cultivator 15. Regarding the rotary cultivator 15, the lowering speed setting dial 235 sets the speed in lowering the rotary cultivator 15 in order to reduce the impact applied to the rotary cultivator 15 when the rotary cultivator 15 is lowered.

When the main transmission lever 290 is tilted to the front side (the side of the steering handle 9), the pump cam plate 159 (see FIG. 3) is tilted to a positive inclination angle side in accordance with the operating position of the main transmission lever 290, which is detected by a main transmission potentiometer 222, thereby accelerating the travelling speed of the travelling machine body 2. In contrast, when the main transmission lever 290 is tilted to the rear side (the side of the maneuvering seat 8), the pump cam plate 159 (see FIG. 3) is tilted to a negative inclination angle side in accordance with the operating position of the main transmission lever 290, which is detected by the main transmission potentiometer 222, thereby decelerating the travelling speed of the travelling machine body 2.

The operator can operate the main transmission lever 290 in a state where his arm is placed on the arm rest 259. Accordingly, the main transmission lever 290 is exceedingly easily operated, and a high degree of effectiveness in terms of the improvement of travelling maneuverability of the tractor 1 can be achieved. In this time, in a state where the arm is rested on the arm rest 259, the position of the stepped portion 284 described above is provided in such a manner that the neighborhood of the wrist or the like is hardly overlapped with the stepped portion 284 when viewed from a plane. Accordingly, the arm on the arm rest 259 or the like is not inadvertently bumped into the setting dial 226 and the selecting switch 227 (does not serve as an obstacle), which reduces the operational errors of the setting dial 226 and the selecting switch 227.

An automatic hoisting and lowering switch 229 is arranged on the front surface of the main transmission lever 290, and a hoisting and lowering fine adjusting switch 230 (see FIG. 12) is arranged on the side surface (left side surface) of the main transmission lever 290. Also, a display switching switch 231 (see FIG. 12) is arranged on the left side surface of the main transmission lever 290, whereas a mode switching switch 232 (see FIG. 12) is arranged on the right side surface of the main transmission lever 290. The automatic hoisting and lowering switch 229 is used to perform the operations of forcibly hoisting and lowering the rotary cultivator 15 to a predetermined height. The hoisting and lowering fine adjusting switch 230 is used to perform the operation of fine adjustment of the height position of the rotary cultivator 15. The display switching switch 231 is used to switch the contents displayed on a liquid crystal display panel 330. The mode switching switch 232 is used to change and adjust the travelling speed during rotation and backward movement.

The automatic hoisting and lowering switch 229 is a self-reset type (momentary type) lever switch for tilting in the up-and-down direction. When the automatic hoisting and lowering switch 229 is tilted to the upper side, the rotary cultivator 15 ascends to the maximum raised position set by the maximum raised position setting dial 234, whereas when the automatic hoisting and lowering switch 229 is tilted to the lower side, the rotary cultivator 15 descends to the position set by the work portion position dial 300. The hoisting and lowering fine adjusting switch 230 is constituted of a self-reset type (momentary type) rocker switch, and only when the hoisting and lowering fine adjusting switch 230 is operated, the rotary cultivator 15 ascends or descends.

Thus, the main transmission lever 290 includes the automatic hoisting and lowering switch 229, the hoisting and lowering fine adjusting switch 230, the display switching switch 231, and the mode switching switch 232, so that the operator can easily perform control in accordance with travelling situations only with a right-hand operation by use of the main transmission lever 290. That is, the automatic hoisting and lowering switch 229 and the hoisting and lowering fine adjusting switch 230 are operated while the main transmission lever 290 is operated and tilted, thereby adjusting the height position of the rotary cultivator 15. Also, even when it is required to switch the contents displayed on the liquid crystal display panel 330, the operator only needs to operate the display switching switch 231 without moving his hand off the main transmission lever 290. Furthermore, when the tractor 1 is rotated or moved backward, its travelling speed can be easily adjusted to a travelling speed appropriately set in advance only by operating the mode switching switch 232 of the main transmission lever 290.

The work portion position dial (hoisting and lowering dial) 300 is fitted into the right side surface (the side surface on the side of the fender 19) of the extension portion 282 of the arm rest 259. The work portion position dial 300 includes a knob portion (operating protrusion) protruded to the outside (upper side) on the upper surface side of the extension portion 282 out of the outer circumferential surface thereof. Even though the knob portion of the work portion position dial 300 is disposed at the uppermost position of the work portion position dial 300, the upper end of the knob portion is positioned lower than the upper surface of the extension portion 282.

The work portion position dial 300 protrudes to the outer side (the side of the fender 19) with respect to the right side surface of the extension portion 282. Accordingly, not only can the operator perform the rotational operation of the work portion position dial 300 by moving the knob portion back and forth with his fingers from the upper side of the arm rest 259, but also, even when the operator holds the outer circumferential surface from the right side (the side of the fender 19) of the arm rest 259, the operator can perform the rotational operation of the work portion position dial 300. Consequently, the operator can easily operate the work portion position dial 300 in a state where his arm is rested on an upper surface lid 287 (on the arm rest 259).

Figure 2:
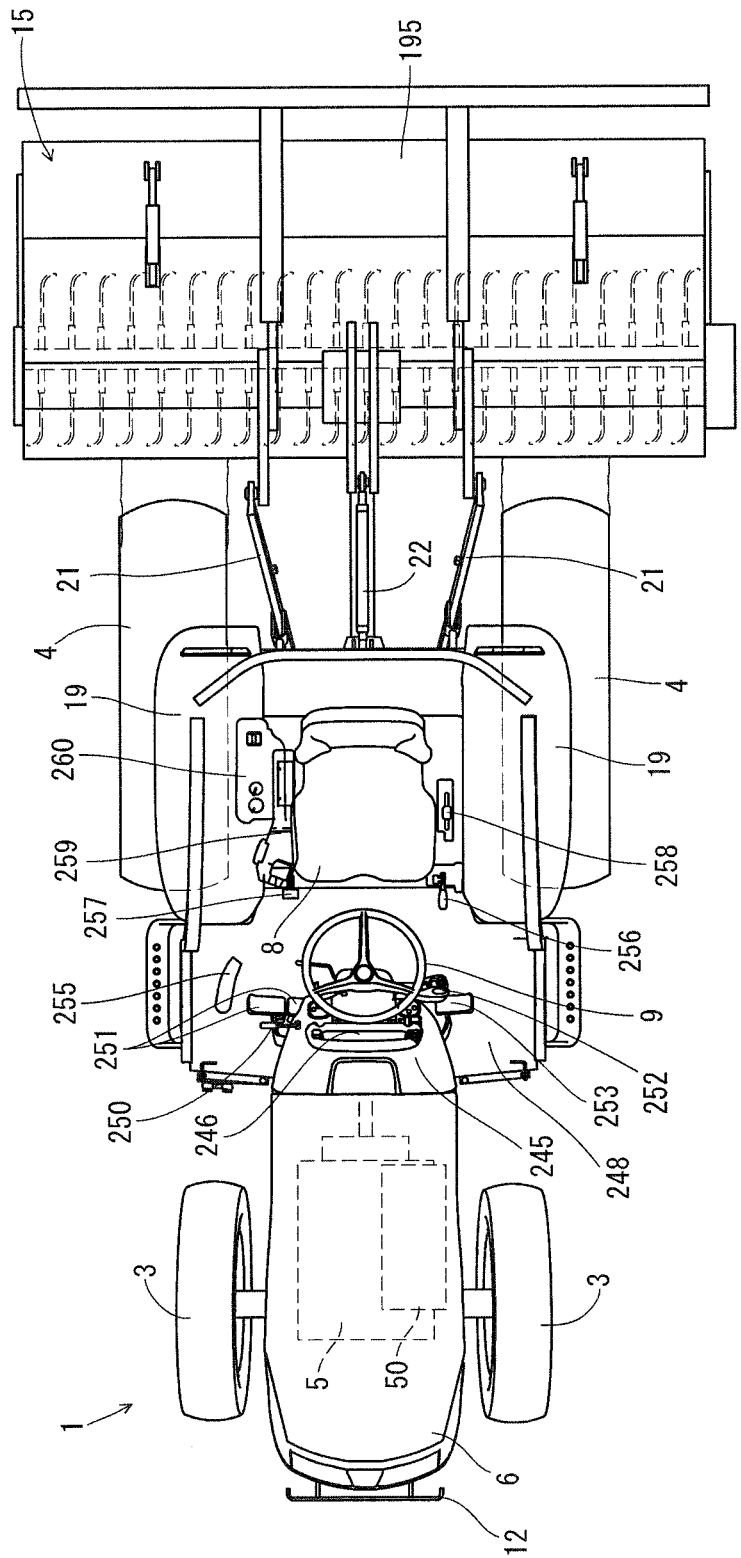
FIG. 2 is a plan view of the tractor.

When the work portion position dial 300 is operated and rotated to the front, a control electromagnetic valve 121 performs a switching operation, which drivingly shortens a single-acting hydraulic cylinder not illustrated and rotates a lift arm 193 downward (see FIG. 1). As a result, the rotary cultivator 15 moves downward via the lower links 21. Conversely, when the work portion position dial 300 is operated and tilted to the rear, the control electromagnetic valve 121 performs the switching operation, which drivingly extends the single-acting hydraulic cylinder not illustrated and rotates the lift arm 193 upward. As a result, the rotary cultivator 15 moves upward via the lower links 21.

In the embodiment, the main transmission lever 290, the setting dial 226, and the selecting switch 227 are arranged on the upper surface of the extension portion 282, which is the front portion of the arm rest 259, and the work portion position dial 300 is arranged on the side surface of the extension portion 282. Then, the main transmission lever 290, the setting dial 226, and the selecting switch 227 are arranged on the left side (the side of the maneuvering seat 8) of the extension portion 282, and the work portion position dial 300 is arranged on the right side (the side of the fender 19) of the extension portion 282. Accordingly, it is easy for the operator to discriminate the travelling operating means from the work operating means, even during the operation of the tractor 1, which is effective in preventing operational errors. Also, the main transmission lever 290, the setting dial 226, and the selecting switch 227, each of which is the travelling operating means, are arranged en masse, which excels in maneuverability (handleability).

Also, when a hand disposed on the arm rest 259 moves in the right-and-left direction with the elbow as a fulcrum, the main transmission lever 290 and the work portion position dial 300 are placed within hand's reach in an easy manner. Accordingly, there is an advantage in that the main transmission lever 290 and the work portion position dial 300 can be operated only with the hand disposed on the arm rest 259. Then, when the arm is rested on the arm rest 259, the main transmission lever 290 and the work portion position dial 300 on the extension portion 282 can be operated with a hand in a natural posture without bending the wrist downward. Accordingly, the maneuverability of the main transmission lever 290 or the work portion position dial 300 is improved to a great extent, which contributes to the stable support of the hand.

Figure 4:
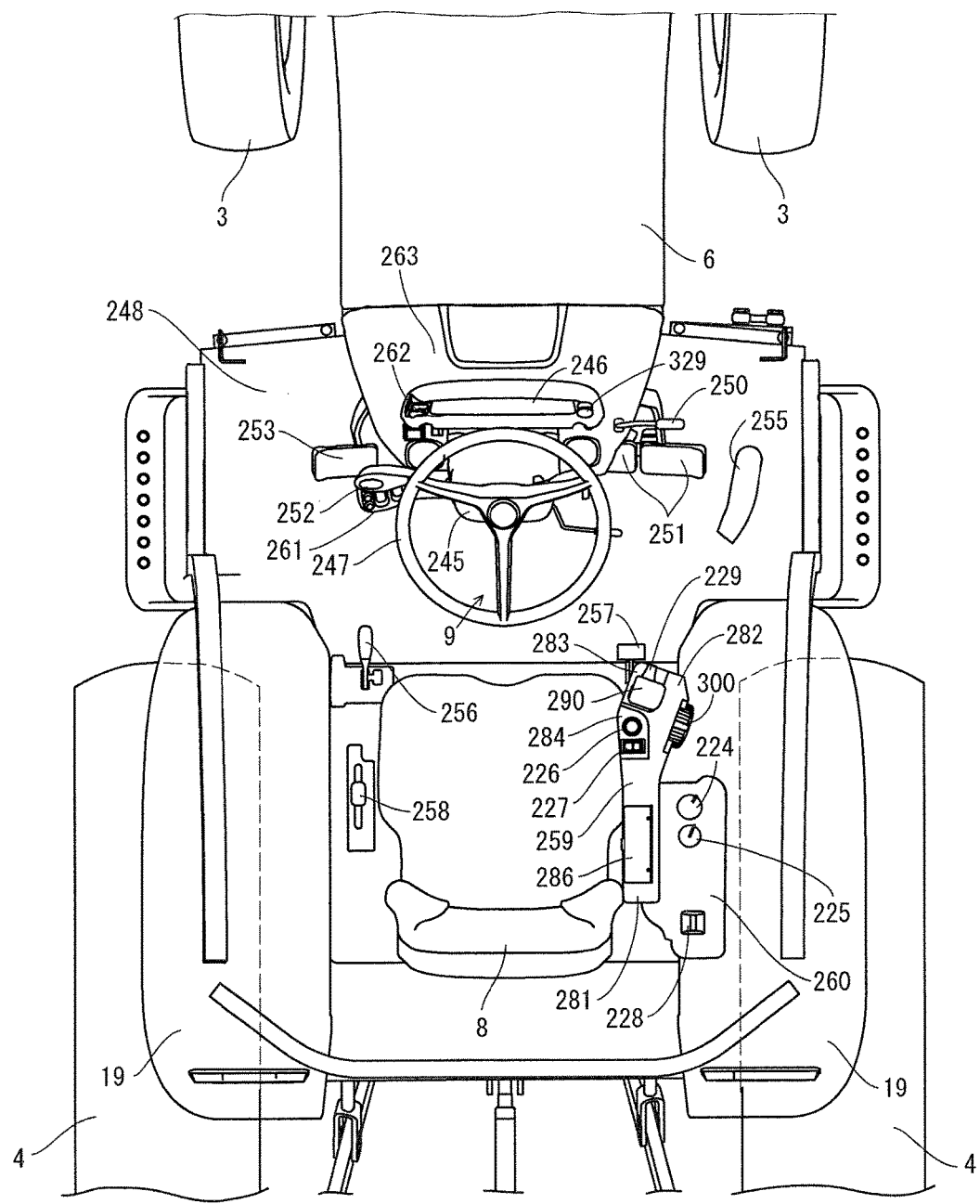
FIG. 4 is a plan view of a cabin.
Figure 5:
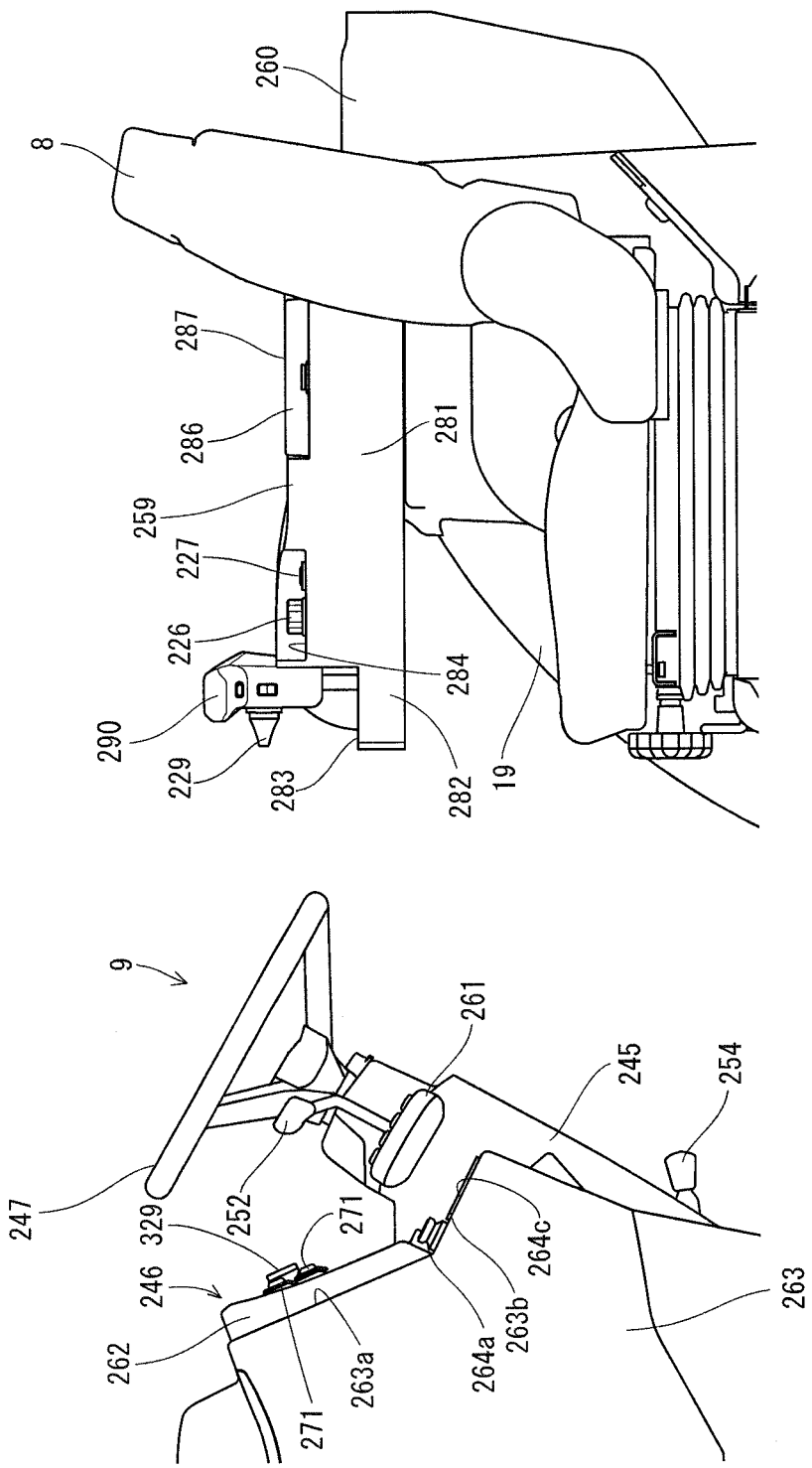
FIG. 5 is as left side view in the cabin.
Figure 6:
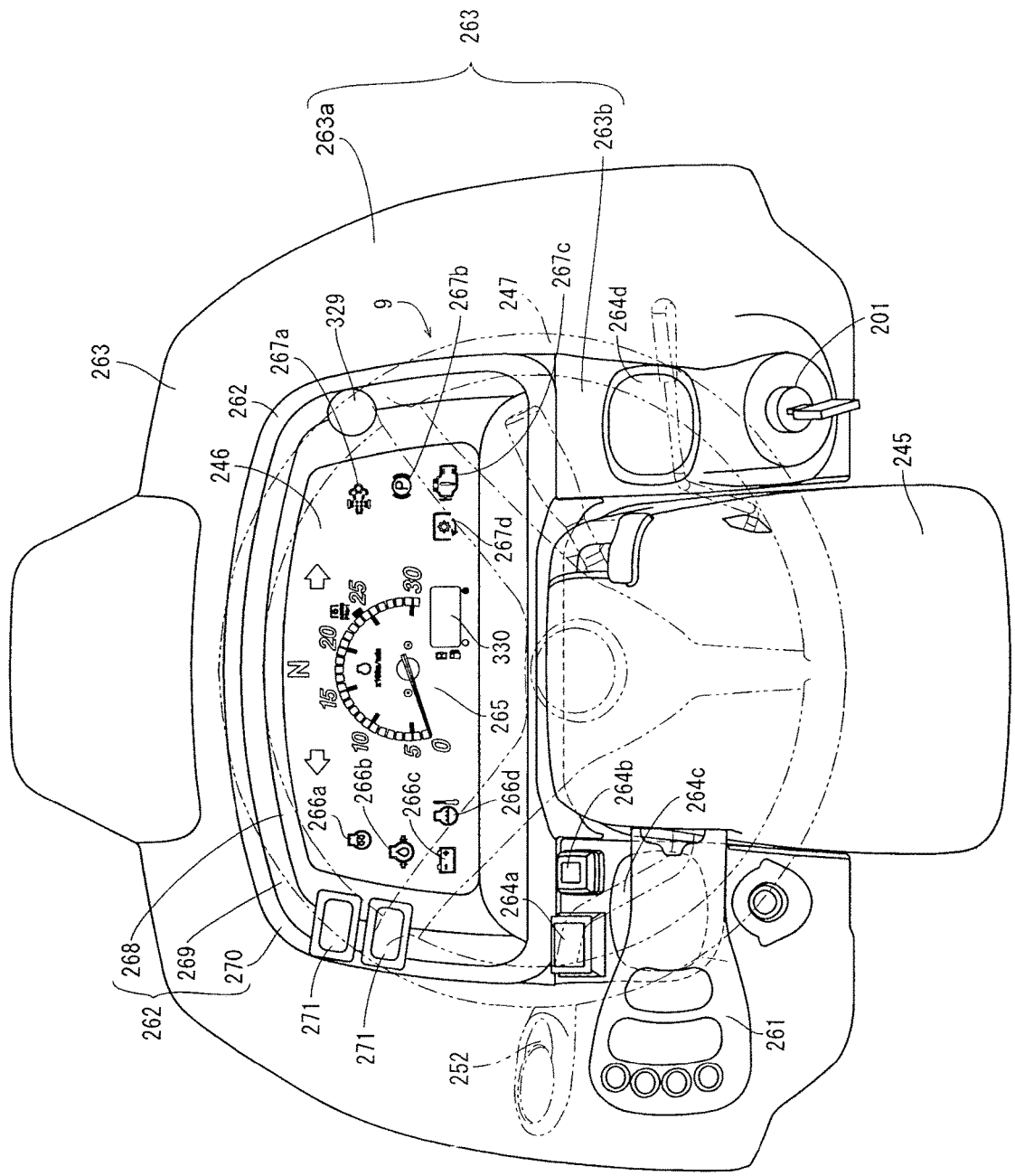
FIG. 6 is a front view of a meter panel viewed from the side of a maneuvering seat.
Figure 7:
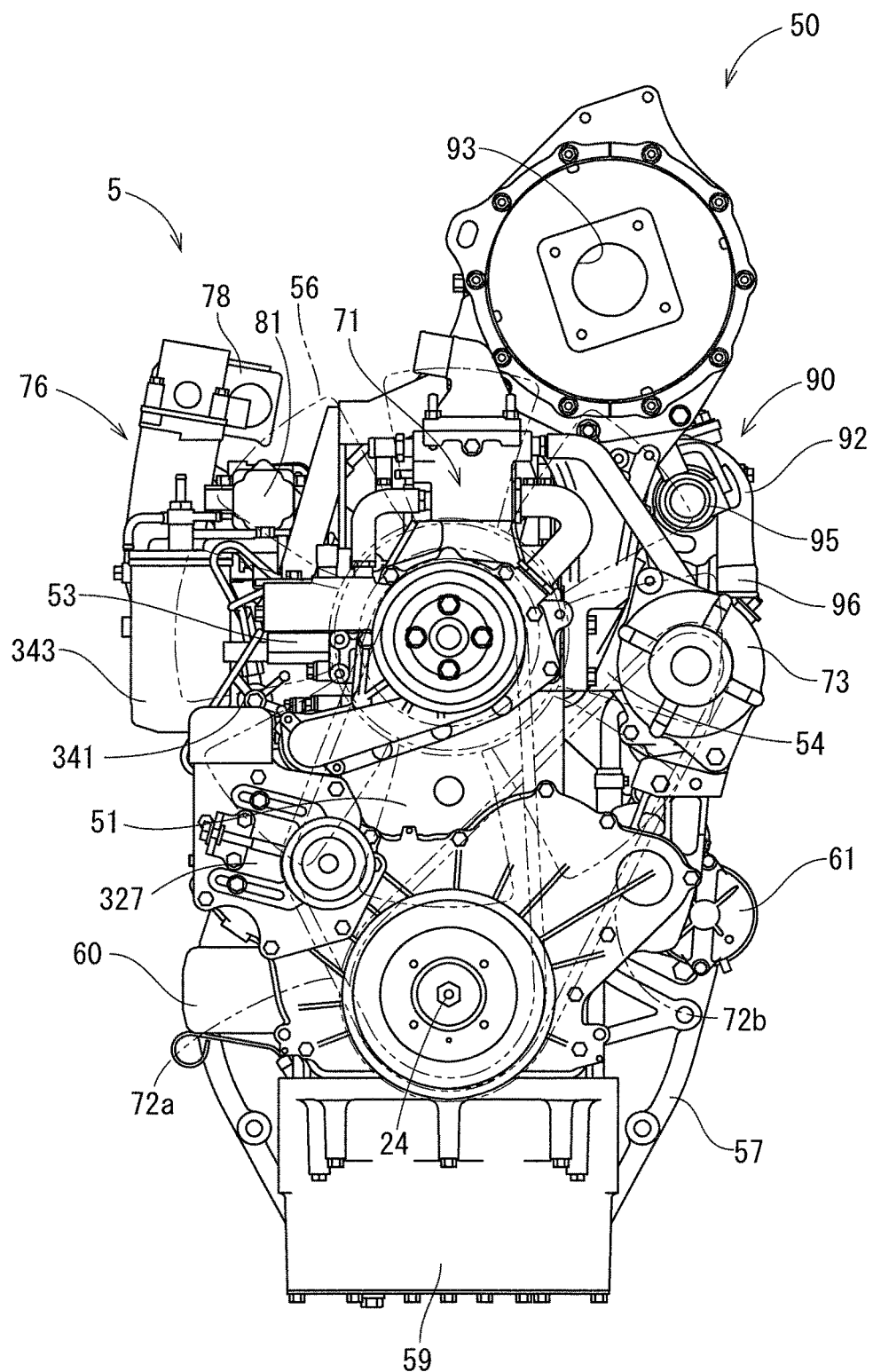
FIG. 7 is a front view of an engine of an embodiment.
Figure 8:
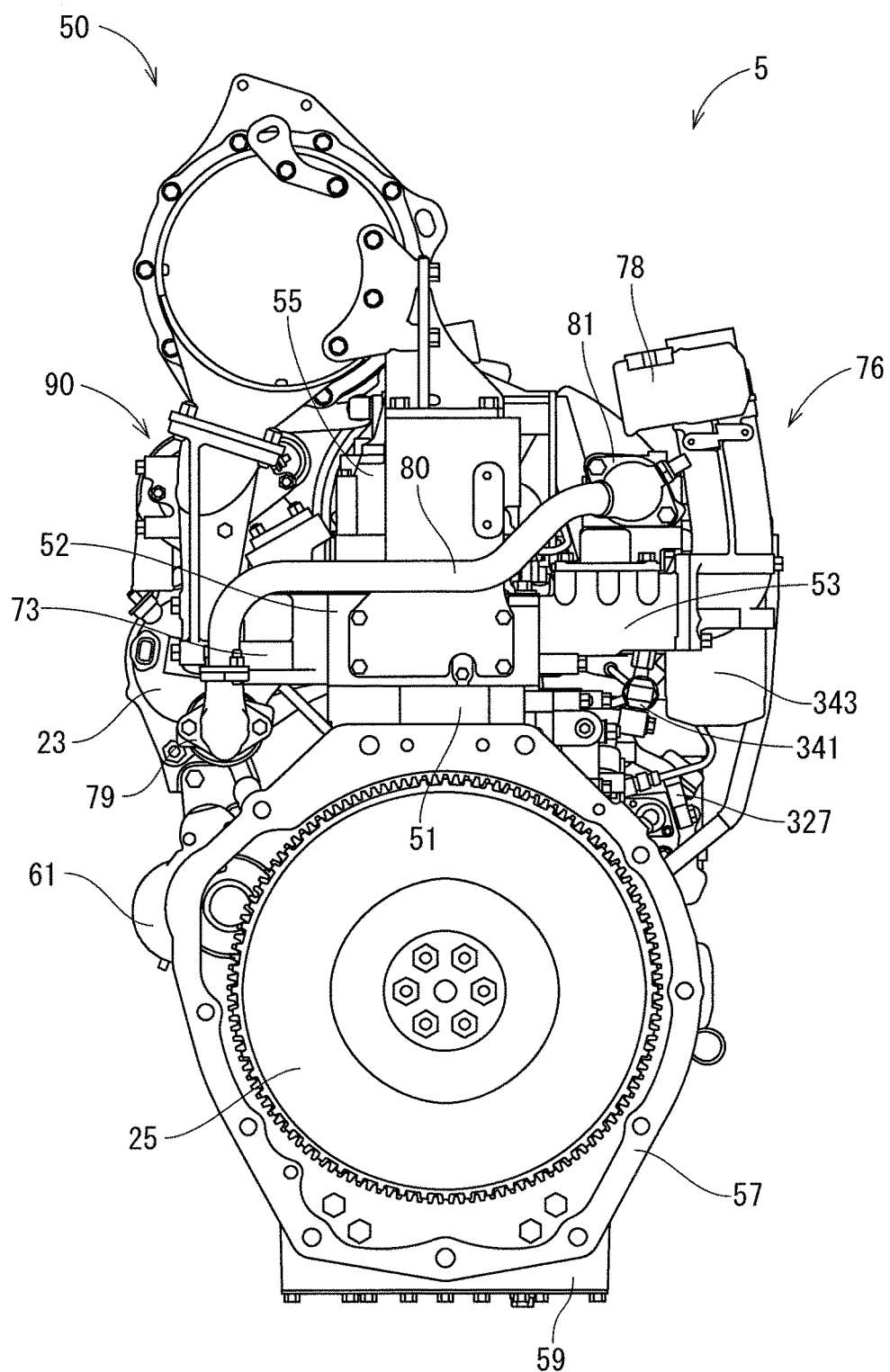
FIG. 8 back view of the engine.
Figure 9:
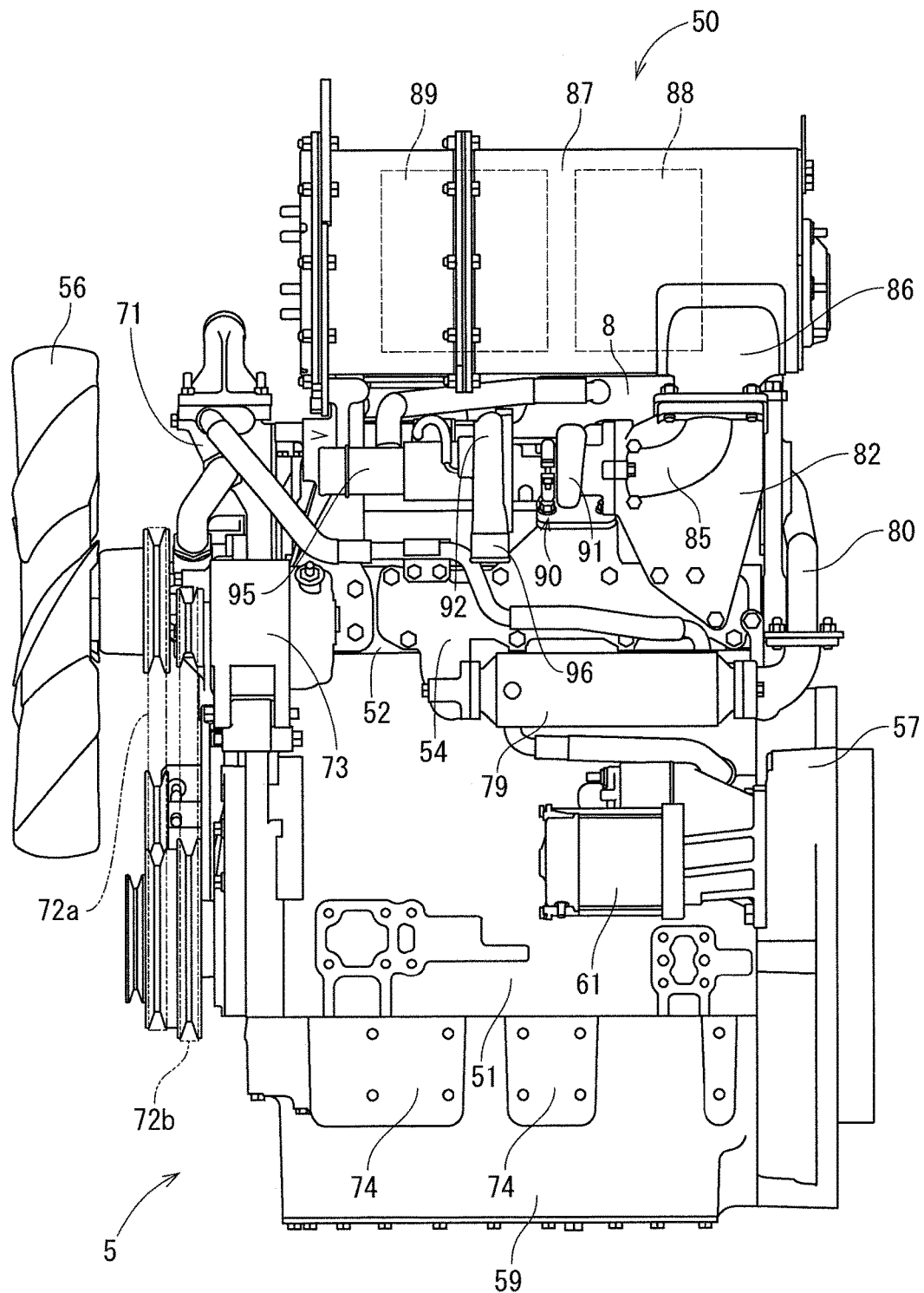
FIG. 9 is a left side view of the engine.

As illustrated in FIGS. 4 to 6, a meter panel 246 is arranged at a position on the lower side in front of the steering wheel 247 in such a manner as to face the operator who sits on the maneuvering seat 8 in a state where the surface of the panel is inclined slightly upward from the rear. Also, the outer edge of the meter panel 246 is covered with a meter cover 262 raised from the inner side to the outer side. Then, the meter panel 246 covered with the meter cover 262 is arranged on the surface (rear surface) in back of a dashboard 263 of the upper portion in front of the steering column 245. The dashboard 263 constitutes a maneuvering column along with the steering column 245.

The rear surface of the dashboard 263, as illustrated in FIG. 5, is constituted of two planes made up of a meter installation surface 263a, which is inclined in such a manner that a normal line is directed on the upper side in the rear, and a switch installation surface 263b. The meter installation surface 263a and the switch installation surface 263b are planes of which the normal line is differently inclined, and the meter installation surface 263a is a plane inclined in such a manner as to be directed to the rear, whereas the switch installation surface 263b is a plane inclined in such a manner as to be directed upward.

That is, as illustrated in FIGS. 5 and 6, the meter installation surface 263a arranged on the upper portion of the rear surface of the dashboard 263 is arranged in front of the steering column 245, and the meter panel 246 is arranged on the inner side of the meter installation surface 263a. In contrast, the switch installation surface 263b arranged on the upper portion of the rear surface of the dashboard 263 is arranged at a front position on the lower side of the forward/backward switching lever 252, on both right and left sides of the steering column 245, in such a manner as to be directed on the upper side, compared with the meter installation surface 263a, and switches 264a to 264d are arranged. For example, the switches 264a to 264d are allocated as a rotation hoisting switch or a backward hoisting switch that designates the automatic hoisting of the rotary cultivator 15 during the rotation of the vehicle or during the backward movement of the vehicle, a work machine control switch for automatically performing the horizontal control or tilling depth control during tilling work by means of the rotary cultivator 15, an emergency blinker switch for blinking an emergency stop lamp, a side lamp switch for supporting the turning-on and turning-off of work lights, and the like.

The meter panel 246 as a driving operation display device, as illustrated in FIG. 6, includes an engine tachometer 265 for indicating the revolutions of the engine 5 with a pointer in the central display area thereof and includes display lamps 266a to 266d and 267a to 266d made up of LEDs and the like in the display areas on the outer sides of the right and left of the engine tachometer 265. The meter panel 246 having the aforementioned constitution actuates the display lamps 266a to 266d and 267a to 267d as a warning light for indicating abnormality of each portion of the tractor 1 or a display light for indicating the travelling state of the tractor 1 or the operating state of the rotary cultivator 15, or the like. Then, one of the display lamps 266a to 266d and 267a to 267d is allocated to a regeneration lamp 332 (see FIG. 12) that flickers in accordance with the regenerating operation of an exhaust gas purification device 50. Also, the meter panel 246 includes the liquid crystal display panel 330 described later on the lower side of the engine tachometer 265.

The meter cover 262 has structure in such a manner as to be raised to the rear from the installation section of the meter panel 246 to the outer circumference. That is, the meter cover 262 includes an inner circumferential side surface 268 vertically arranged to the rear in such a manner as to surround the outer circumference of the meter panel 246, a U-shaped backward rear surface 269 provided in such a manner as to surround the right and left of the outer side and upper side of the inner circumferential side surface 268, and an outer circumferential side surface 270 vertically arranged from the meter installation surface 263a of the dashboard 263, which is the outer circumference of the backward rear surface 269.

The backward rear surface 269 of the meter cover 262 is a surface approximately in parallel to the meter installation surface 263a. Then, switches 271 are installed on the surface on the left side on the backward rear surface 269, and a regeneration switch 329 described later is installed on the surface on the right side on the backward rear surface 269. It is noted that the switches 271, for example, are allocated as a work lamp switch that receives the turning-on and turning-off of the work lights installed in the cabin 7 (see FIG. 1), a wiper switch that drives wipers 42 and 43 (see FIG. 1) respectively for removing water droplets on a windshield 40 or rear window glass 41 in the cabin 7, or the like.

The regeneration switch 329 is of a momentary motion type. That is, the regeneration switch 329 is a push switch of a non-rock type, which outputs one ON pulse signal when the switch is pressed down once. The duration during which the operator holds the regeneration switch 329 pressed down is adopted as one of standards for determining whether or not each regeneration control after reset regeneration control (described later in detail) can be executed. The regeneration switch 329 of the embodiment is constituted of a switch equipped with a lamp, wherein a regeneration switch lamp 345 is incorporated.

As described above, in the dashboard 263, which serves as part of the maneuvering column, the regeneration switch 329 is arranged on the meter cover 262 disposed on the outer side of the meter panel 246, which is a driving operation display portion. Then, in the embodiment, regarding the meter panel 246, the display lamp 267*a* arranged on the uppermost portion on the right-side area of the engine tachometer 265 is allocated to the regeneration lamp 332 (see FIG. 12). Accordingly, the regeneration switch 329 is arranged in the vicinity of the meter panel 246 that displays a regeneration request warning described later by means of the display lamp 267*a*, so that the operator can perform the operation of the regeneration switch 329 in a state of visually recognizing the display of the meter panel 246. Consequently, the operational errors of the operator regarding the regeneration switch 329 can be prevented.

Also, in the embodiment, the regeneration switch 329 is arranged in the vicinity of the display lamp 267*a* of the meter panel 246, which acts as the regeneration lamp 332 (see FIG. 12). That is, the regeneration switch 329 is arranged in the vicinity of the display area of the regeneration control request warning in the meter panel 246, which serves as the driving operation display portion. Accordingly, when the regeneration request warning is notified by the display of the display lamp 267*a*, the operator can easily recognize the operating position of the regeneration switch 329.

Next, the schematic structure of the common-rail diesel engine 5 of the embodiment will be described referring to FIGS. 7 to 11. It is noted that, in the description below, the bilateral portions along the engine output shaft 24 (the bilateral portions between which the engine output shaft 24 is sandwiched) are referred to as "right-and-left", and the installation side of a cooling fan 56 is referred to as "front side", and the installation side of the flywheel 25 is referred to as "rear side", and the installation side of an exhaust manifold 54 is referred to as "left side", and the installation side of an intake manifold 53 is referred to as "right side", which serves as references for the four directions and the up-and-down positional relation regarding the engine 5 for convenience' sake.

As illustrated in FIGS. 7 to 11, the engine 5 mounted on the work vehicle such as the tractor, as a power engine, includes the continuously regenerating exhaust gas purification device 50 (DPF). The particulate matter (PM) in the exhaust gas emitted from the engine 5 is removed by the exhaust gas purification device 50, and carbon monoxide (CO) or hydrogen carbon (HC) in the exhaust gas is reduced.

The engine 5 includes a cylinder block 51 in which the engine output shaft 24 (crankshaft) and pistons (not illustrated) are incorporated. A cylinder head 52 is mounted on the cylinder block 51. The intake manifold 53 is arranged on the right side surface of the cylinder head 52. The exhaust manifold 54 is arranged on the left side surface of the cylinder head 52. That is, the intake manifold 53 and the exhaust manifold 54 are allocated and arranged on the bilateral surfaces along the engine output shaft 24 in the engine 5. A head cover 55 is arranged on the upper surface of the cylinder head 52. The cooling fan 56 is provided on one side surface intersecting with the engine output shaft 24 in the engine 5, specifically, on the front surface of the cylinder block 51. The rotational power is transmitted from the front end side of the engine output shaft 24 to the cooling fan 56 via a V belt 72*a* for the cooling fan.

A flywheel housing 57 is provided on the rear surface of the cylinder block 51. The flywheel 25 is arranged in the flywheel housing 57. The flywheel 25 is pivotally supported on the rear end side of the engine output shaft 24. It is configured such that the power of the engine 5 is taken out to the work portion of the work vehicle via the engine output shaft 24. Also, an oil pan 59 is arranged on the lower surface of the cylinder block 51. Lubricating oil in the oil pan 59 is supplied to each lubricating portion of the engine 5 via an oil filter 60 arranged on the right side surface of the cylinder block 51.

A fuel supply pump 327 for supplying fuel is mounted above the oil filter 60 (below the intake manifold 53) on the right side surface of the cylinder block 51. Injectors 340 equipped with a fuel injection valve 328 (see FIG. 13) of an electromagnetic opening/closing control type, are provided in the engine 5. Each injector 340 is connected to a fuel tank 344 (see FIG. 13) mounted on the work vehicle via the fuel supply pump 327, a cylindrical common rail 341, and a fuel filter 343.

The fuel in the fuel tank 344 is pressure-fed from the fuel supply pump 327 to the common rail 341 via the fuel filter 343, and high-pressure fuel is accumulated in the common rail 341. The fuel injection valve 328 of each injector 340 is controlled in such a manner as to be opened and closed respectively, and the high-pressure fuel in the common rail 341 is injected from each injector 340 to each cylinder of the engine 5. It is noted that a starter 61 for starting the engine is provided in the flywheel housing 57. The pinion gear of the starter 61 for starting the engine is meshed with a ring gear of the flywheel 25. When the engine 5 is started, the ring gear of the flywheel 25 is rotated by the rotational force of the starter 61, which causes the engine output shaft 24 to start rotating (what is called cranking is executed).

A coolant pump 71 is arranged coaxially with the fan shaft of the cooling fan 56 on the front surface side (the side of the cooling fan 56) of the cylinder head 52. As a generator, an alternator 73 that generates electricity by use of the power of the engine 5 is provided on the left side of the engine 5, specifically, on the left side of the coolant pump 71. The rotational power is transmitted from the front end side of the engine output shaft 24 to the cooling fan 56 and the coolant pump 71 via the V belt 72*a* for the cooling fan. Also, the rotational power is transmitted from the front end side of the engine output shaft 24 to the alternator 73 via a V belt 72*b* for the alternator. The coolant in the radiator mounted on the work vehicle is supplied to the cylinder block 51 and the cylinder head 52 by means of the drive of the coolant pump 71, thereby cooling the engine 5.

Engine leg mounting units 74 are respectively provided on the right and left side surfaces of the oil pan 59. In each engine leg mounting unit 74, an engine leg body (not illustrated) that includes a vibration-proof rubber can be fastened with bolts. In the embodiment, the oil pan 59 is clamped with a pair of right and left engine frames of the work vehicle, and the engine leg mounting unit 74 on the side of the oil pan 59 is fastened with bolts to each engine frame, so that the both engine frames of the work vehicle supports the engine 5.

Figure 10:
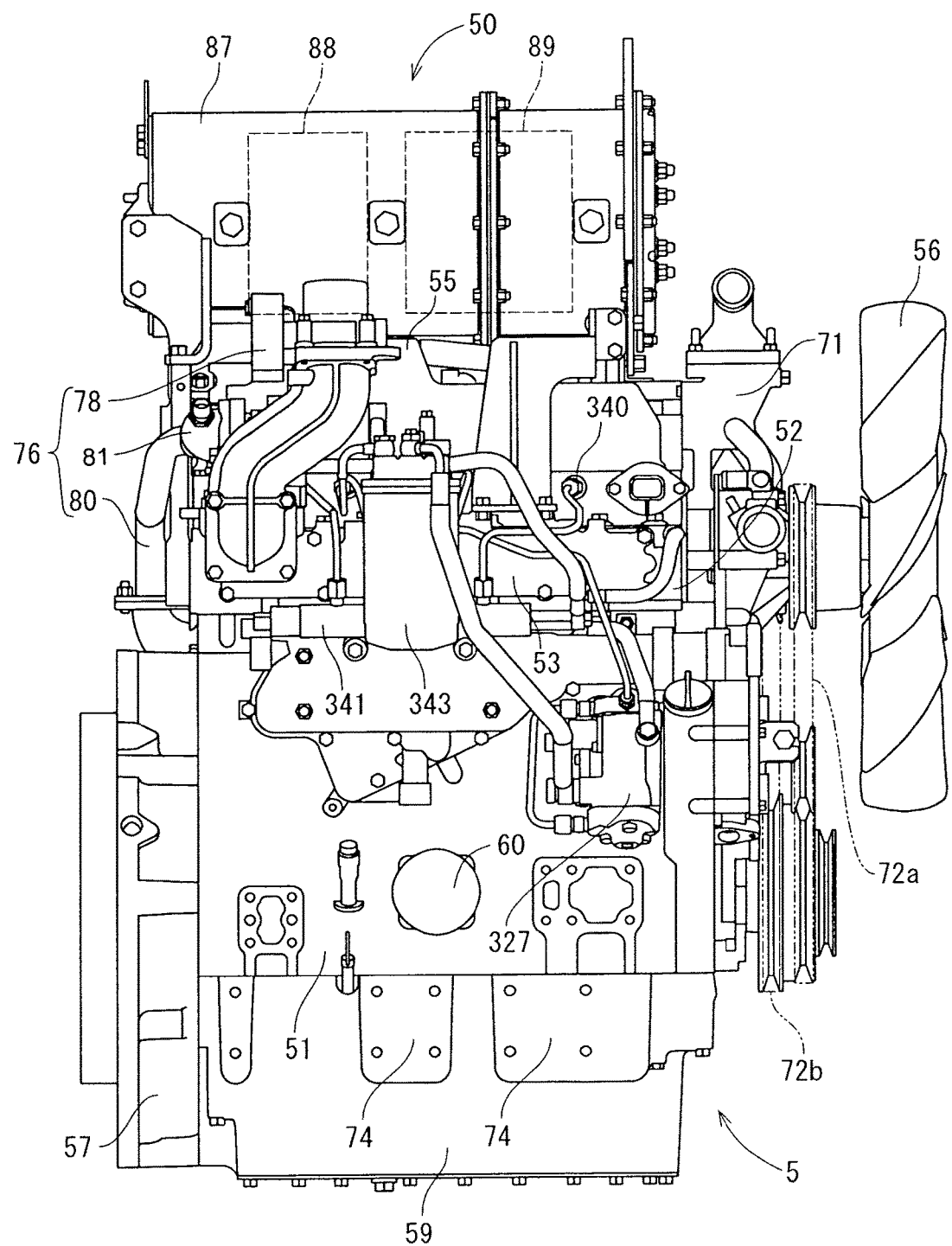
FIG. 10 is a right side view of the engine.
Figure 11:
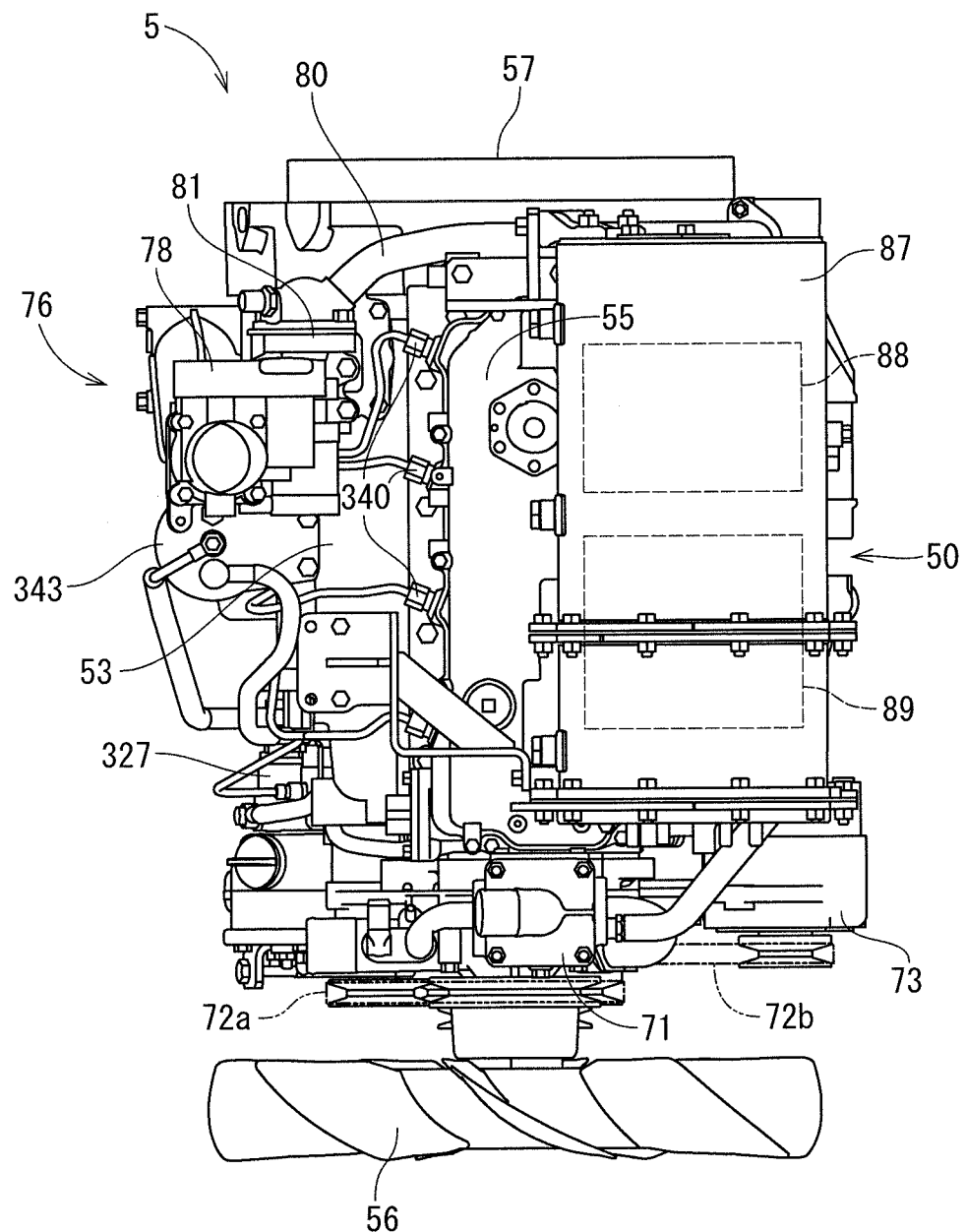
FIG. 11 is a pan view of the engine.

As illustrated in FIGS. 10 and 11, an air cleaner is coupled with the inlet port of the intake manifold 53 via an EGR device 76 (exhaust gas recirculation device). The EGR device 76 is mainly positioned on the right side of the engine 5, specifically, the right side of the cylinder head 52. After fresh air (outside air) drawn in by the air cleaner is purified by removing dust by means of the air cleaner, the fresh air is delivered to the intake manifold 53 via a compressor case 92 of a turbo supercharger 90 and the EGR device 76 and supplied to each cylinder of the diesel engine 5.

The EGR device 76 includes an EGR main body case that mixes the part of the exhaust gas (EGR gas) of the engine 5 with the fresh air and supplies the mixed air to the intake manifold 53, an intake throttle member 78 through which the EGR main body case communicates with the air cleaner, a recirculation exhaust gas pipe 80 connected to the exhaust manifold 54 via an EGR cooler 79, and an EGR valve member 81 through which the EGR main body case communicates with the recirculation exhaust gas pipe 80. In the embodiment, the air intake side of the intake manifold 53 constitutes the EGR main body case.

That is, the intake throttle member 78 is coupled with the air intake side of the intake manifold 53. Also, the outlet side of the recirculation exhaust gas pipe 80 is connected to the air intake side of the intake manifold 53. The inlet side of the recirculation exhaust gas pipe 80 is connected to the exhaust manifold 54 via the EGR cooler 79. The opening degree of the EGR valve disposed in the EGR valve member 81 is adjusted, thereby adjusting the amount of EGR gas supplied to the air intake side of the intake manifold 53.

With the aforementioned constitution, the fresh air is supplied from the air cleaner into the air intake side of the intake manifold 53 via the intake throttle member 78, whereas the EGR gas is supplied from the exhaust manifold 54 into the air intake side of the intake manifold 53. The fresh air from the air cleaner and the EGR gas from the exhaust manifold 54 are mixed in the air intake side of the intake manifold 53. Part of the exhaust gas discharged from the engine 5 to the exhaust manifold 54 is returned from the intake manifold 53 to the engine 5, so that the maximum combustion temperature during high-load operations is reduced, and the amount of NOx (nitride oxides) discharged from the engine 5 is reduced.

The turbo supercharger 90 is arranged on the left side of the cylinder head 52 and above the exhaust manifold 54. The turbo supercharger 90 includes a turbine case 91 in which a turbine wheel is incorporated, and a compressor case 92 in which a blower wheel is incorporated. The exhaust intake side of the turbine case 91 is coupled with the outlet side of the exhaust manifold 54. A purification inlet pipe 86 provided on an outer circumferential portion on the exhaust intake side of the exhaust gas purification device 50 is coupled with the exhaust discharge side of the turbine case 91. That is, the exhaust gas discharged from each cylinder of the engine 5 to the exhaust manifold 54 is released to the outside by way of the turbo supercharger 90, the exhaust gas purification device 50, and the like.

The air intake side of the compressor case 92 is connected to the intake-air discharge side of the air cleaner via a feed pipe 95. The intake-air discharge side of the compressor case 92 is connected to the intake manifold 53 via a supercharging pipe 96 and the EGR device 76. That is, the fresh air in which dust is removed by means of the air cleaner is transferred from the compressor case 92 to the EGR device 76 via the supercharging pipe 96, and subsequently supplied to each cylinder of the engine 5.

The exhaust gas purification device 50 is arranged above the exhaust manifold 54 and the turbo supercharger 90 on the upper surface side of the engine 5, that is, above the exhaust manifold 54 and the turbo supercharger 90 on the left side of the cylinder head 52. In this case, the posture of the exhaust gas purification device 50 is set in such a manner that the longitudinal direction of the exhaust gas purification device 50 extends in parallel to the engine output shaft 24 of the engine 5.

Next, the structure of the exhaust gas purification device 50 will be described. The exhaust gas purification device 50 includes a purification housing 87 that includes the purification inlet pipe 86. In the interior of the purification housing 87, a diesel oxidation catalyst 88 such as platinum that generates nitrogen dioxide ($NO_2$), and a soot filter 89 having honeycomb structure, in which the particulate matter (PM) collected is consecutively oxidized and removed at a relatively low temperature, are placed in series in the transfer direction of the exhaust gas. The diesel oxidation catalyst 88 and the soot filter 89 correspond to the exhaust gas purification device stored in the purification housing 87. It is noted that the exhaust gas outlet 93 of the purification housing 87 is coupled, for example, to a silencer or a tail pipe via an exhaust pipe, and the exhaust gas is discharged from the exhaust gas outlet 93 to the outside via the silencer or the tail pipe.

With the aforementioned constitution, the nitrogen dioxide ($NO_2$) generated by the oxidation action of the diesel oxidation catalyst 88 is taken into the soot filter 89. The particulate matter included in the exhaust gas of the engine 5 is collected by the soot filter 89, consecutively oxidized, and removed by the nitrogen dioxide ($NO_2$). In addition to the removal of the particulate matter (PM) included in the exhaust gas of the engine 5, the content of carbon monoxide (CO) or hydrogen carbon (HC) in the exhaust gas of the engine 5 is reduced.

Next, the constitution to execute various controls (transmission control, automatic horizontal control, and tilling depth automatic control, and the like) of the tractor 1 will be described referring to FIG. 12. As illustrated in FIG. 12, the tractor 1 includes an engine controller 311 for controlling the drive of the engine 5, a meter controller (driving operation display controller) 312 for controlling the display operation of the meter panel 246 mounted on the steering column (maneuvering column) 245, a main machine controller 313 for performing the speed control of the travelling machine body 2, and a work machine controller 314 for performing the state control of the rotary cultivator 15.

The aforementioned controllers 311 to 314 respectively include a ROM that stores control programs and data, a RAM that temporarily stores the control programs and data, a timer as a timing device, input and output interfaces, and the like, besides the CPUs that execute various mathematical processing and control, and the controllers are mutually connected in a communicable manner via a CAN communication bus 315. The engine controller 311 and the meter controller 312 are connected to a battery 202 via a power application key switch 201. The key switch 201 is a rotary-type switch that can be operated in a rotatable manner by use of a predetermined key inserted into a keyhole and mounted at a position on the right side of the steering column 245 of the dashboard 263 as illustrated in FIG. 6.

A steering potentiometer 210 for detecting the amount of rotation (steering angle) of the steering handle 9, the display switching switch 231 for switching the display of the liquid crystal display panel 330, and the regeneration switch 329 as an input member for permitting the regenerating operation of the exhaust gas purification device 50 are connected to the input side of the meter controller 312. Also, the liquid crystal display panel 330 of the meter panel 246, a warning buzzer 331 for sounding in association with the regenerating operation of the exhaust gas purification device 50, and the regeneration lamp 332 as a warning lamp that flickers in association with the regenerating operation of the exhaust gas purification device 50 are connected to the output side of the meter controller 312.

The input side of the main machine controller 313 is connected to a forward/backward potentiometer 211 for detecting the operating position of the forward/backward switching lever 252, a main transmission output shaft rotation sensor 212 for detecting the number of output revolutions of the main transmission output shaft 36, a vehicle speed sensor 213 for detecting the rotational speed (travelling speed) of the front wheels 3 and the rear wheels 4, a brake pedal switch 220 for detecting the presence or absence of the depressing of the brake pedals 251, an autobrake switch 221 for operating the switching of the autobrake electromagnetic valves 67a and 67b, the main transmission potentiometer 222 for detecting the operating position of the main transmission lever 290, a parking brake switch 236 that is turned on in a state where the right and left brake pedals 251 are held at the depressing position by use of the parking brake lever 254 (in a lock state by use of the parking brake lever 254), the revolutions/vehicle-speed setting dial 226, the revolutions/vehicle-speed selecting switch 227, and the mode switching switch 232.

The output side of the main machine controller 313 is connected to the forward clutch electromagnetic valve 46 for actuating the forward clutch cylinder (not illustrated), the backward clutch electromagnetic valve 48 for actuating the backward clutch cylinder (not illustrated), the high-speed clutch electromagnetic valve 136 for actuating the auxiliary transmission hydraulic cylinder (not illustrated), the proportional control valve 123 for actuating the main transmission hydraulic cylinder (not illustrated) in proportion to a manipulated variable in tilting the main transmission lever 290, and the autobrake electromagnetic valves 67a and 67b for actuating the right and left brake actuating mechanisms 65a and 65b respectively.

The input side of the work machine controller 314 is connected to a pendulum rolling sensor 214 for detecting the right and left inclination angles of the travelling machine body 2, a work portion position sensor 215 of a potentiometer type for detecting the right and left relative inclination angles of the rotary cultivator 15 with respect to the travelling machine body 2, a lift angle sensor 216 of a potentiometer type for detecting the rotational angle of a lift arm (not illustrated) that connects the hydraulic hoisting and lowering mechanism 20 with the right and left lower links 21, a rear cover sensor 217 of a potentiometer type for detecting the vertical rotational angle of a cultivator rear cover 195 (see FIGS. 1 and 2) that vertically rotates in accordance with the variation in tilting depth of the rotary cultivator 15, a position dial sensor 223 for detecting the operating position of the work portion position dial 300 that manually changes and adjusts the height position of the rotary cultivator 15, the tilling depth setting dial 224, the PTO clutch switch 225, the inclination manual switch 228, the automatic hoisting and lowering switch 229, the hoisting and lowering fine adjusting switch 230, the inclination setting dial 233, the maximum raised position setting dial 234, and the lowering speed setting dial 235.

The output side of the work machine controller 314 is connected to the PTO clutch hydraulic electromagnetic valve 104 for actuating the PTO clutch 100 not illustrated, the control electromagnetic valve 121 for supplying the hydraulic oil to the single-acting hydraulic cylinder (not illustrated) of the hydraulic hoisting and lowering mechanism 20, and the regeneration switch lamp 345 that is incorporated in the regeneration switch 329 and flickers in accordance with the regenerating operation of the exhaust gas purification device 50.

Figure 13:
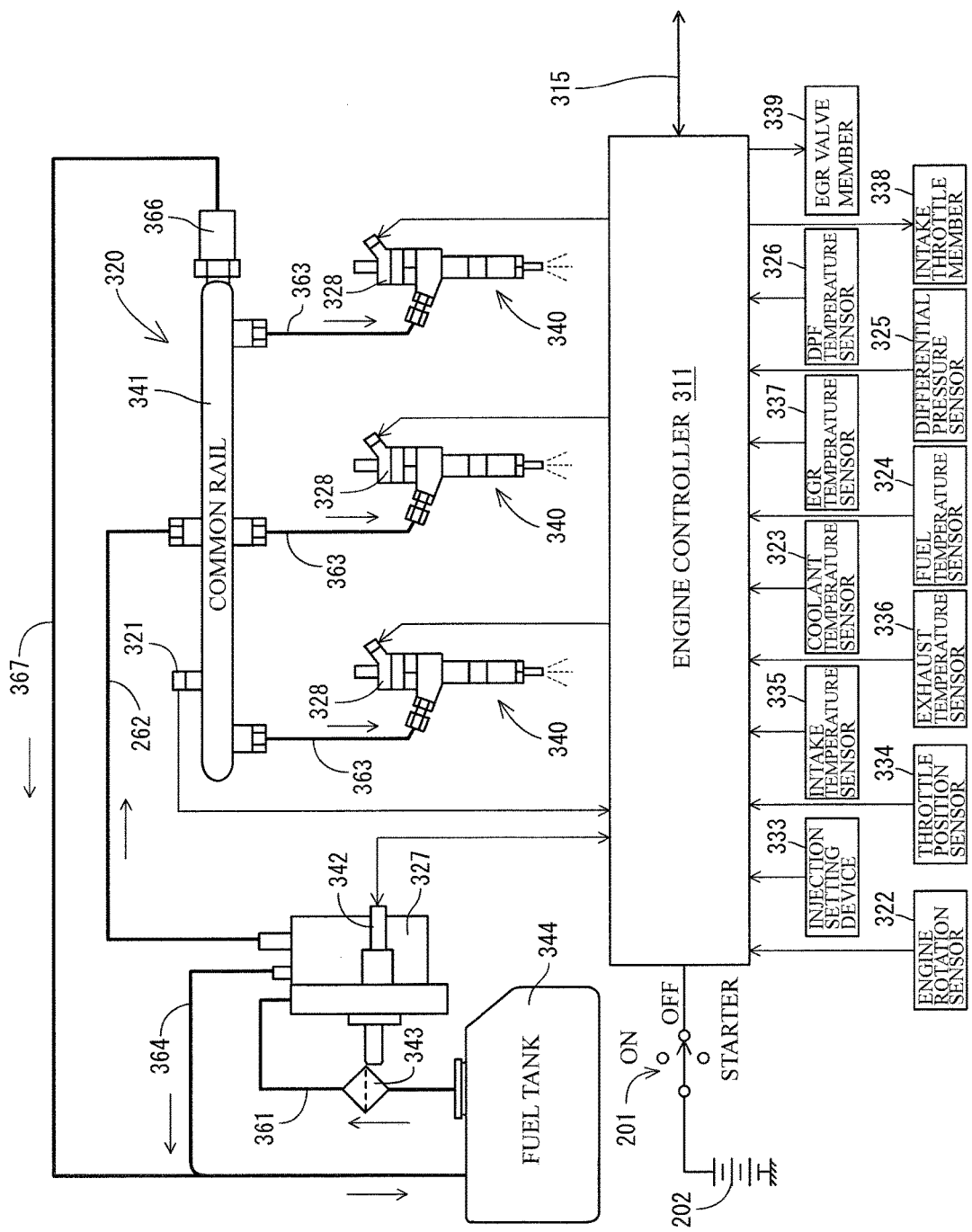
FIG. 13 is an explanatory view of a fuel system of the engine.

Also, as illustrated in FIG. 13, the input side of the engine controller 311 is connected at least to a rail pressure sensor 321 for detecting fuel pressure in the common rail 341, an electromagnetic clutch 342 for rotating or stopping the fuel supply pump 327, an engine rotation sensor 322 for detecting the rotational speed (the position of the camshaft of the engine output shaft 24) of the engine 5, an injection setting device 333 for setting and detecting the number of times of fuel injections (the number of times during fuel injection in one stroke) of the injectors 340, a throttle position sensor 334 for detecting the operating position of an accelerator operating tool, an intake temperature sensor 335 for detecting an intake temperature in an intake path, an exhaust temperature sensor 336 for detecting an exhaust gas temperature in an exhaust gas path, a coolant temperature sensor 323 for detecting a coolant temperature of the engine 5, a fuel temperature sensor 324 for detecting a fuel temperature in the common rail 341, an EGR temperature sensor 337 for detecting the temperature of EGR gas, a differential pressure sensor 325 for detecting the differential pressure of the exhaust gas prior and subsequent (upstream and downstream) to the soot filter 89 in the exhaust filter 50, and a DPF temperature sensor 326 for detecting an exhaust gas temperature in the exhaust filter 50.

The output side of the engine controller 311 is connected at least to an electromagnetic solenoid of each fuel injection valve 328. That is, it is constituted such that the high-pressure fuel accumulated in the common rail 341 is injected from the fuel injection valve 328 in plural times in a separate manner during one stroke while controlling fuel injection pressure, an injection time, an injection period, and the like, thereby suppressing the occurrence of the nitride oxides (NOx) and executing complete combustion in which the occurrence of soot or carbon dioxide ($CO_2$) is reduced, which improves fuel efficiency. Also, the output side of the engine controller 311 is also connected to the intake throttle member 78 for adjusting the intake pressure (intake amount) of the engine 5, the EGR valve member 81 for adjusting the amount of EGR gas supplied to the intake manifold 53, and the like.

Basically, the engine controller 311 obtains the torque of the engine 5 based on the rotational speed detected by the engine rotation sensor 322 and a throttle position detected by the throttle position sensor 334, calculates a target fuel injection amount by use of the torque and output characteristics, and executes fuel injection control that actuates the common rail 341 based on the calculated results. It is noted that the fuel injection amount of the common rail 341 is mainly adjusted by adjusting the period of opening each fuel injection valve 328 and changing the fuel injection period of each injector 340.

The control methods (regeneration control method) of the engine 5 include normal operating control (self-regeneration control) in which the exhaust filter 50 voluntarily regenerates only by the normal operation of the engine 5, assist regeneration control in which when the clogging state of the exhaust filter 50 reaches a prescribed level or higher, the exhaust gas temperature is automatically raised by use of an increase in load of the engine 5, reset regeneration control in which the exhaust gas temperature is raised with post-injection, and non-work regeneration control (also referred to as parking regeneration control or urgency regeneration control) in which the exhaust gas temperature is raised with the combination of the post-injection and the high idling rotational speed of the engine 5.

The normal operating control is a control form during travelling on the road or agricultural work. In the normal operating control, the relation of the rotational speed N to the torque T of the engine 5 is in the self-regeneration area of the output characteristics map, and the exhaust gas temperature of the engine 5 is high to the extent that the amount of PM oxidized in the exhaust filter 50 exceeds the amount of PM captured.

In the assist regeneration control, the exhaust filter 50 is regenerated by adjusting the open degrees of the intake throttle member 78 and after-injection. That is, in the assist regeneration control, the valve of the EGR valve member 81 is closed while the valve of the intake throttle member 78 is closed (throttled) to a predetermined open degree, thereby restricting the intake amount supplied to the engine 5. In this manner, load in the engine 5 increases, which causes the fuel injection amount of the common rail 341 to increase in order to maintain the setting rotational speed and leads to an increase in the exhaust gas temperature of the engine 5. In step with this, diffusion combustion is activated by the after-injection in which the injection is slight delayed to the main injection, thereby increasing the exhaust gas temperature of the engine 5. As a result, the PM in the exhaust filter 50 is combusted and removed. It is noted that the valve of the EGR valve member 81 is closed in any regeneration control described below.

The reset regeneration control is performed when the assist regeneration control fails (when the clogging state of the exhaust filter 50 is not improved, and the PMs remain) or when a cumulative drive time TI of the engine 5 becomes equal to or higher than a setting time TI1 (for example, approximately 100 hours). In the reset regeneration control, the exhaust filter 50 is regenerated by performing the post-injection, in addition to the mode of the assist regeneration control. That is, in the reset regeneration control, in addition to the adjustment of opening degree of the intake throttle member 78 and the after-injection, unburned fuel is directly supplied in the exhaust filter 50 by the post-injection, and the unburned fuel is combusted by use of the diesel oxidation catalyst 88, thereby raising the exhaust gas temperature in the exhaust filter 50 (about 560 degrees Celsius). As a result, the PMs in the exhaust filter 50 are forcibly combusted and removed.

The non-work regeneration control is performed when the reset regeneration control fails (when the clogging state of the exhaust filter 50 is not improved, and the PMs remain) or the like. In the non-work regeneration control, in addition to the mode of the reset regeneration control, the rotational speed N of the engine 5 is maintained at the high idling rotational speed (the maximum rotational speed, for example, 2200 rpm), thereby raising the exhaust gas temperature of the engine 5 and subsequently raising the exhaust gas temperature in the exhaust filter 50 by the post-injection (about 600 degrees Celsius). As a result, under more favorable condition, compared with the reset regeneration control, the PMs in the exhaust filter 50 are forcibly combusted and removed. It is noted that the valve of the intake throttle member 78 is not throttled, but fully closed in the non-work regeneration control. The after-injection in the non-work regeneration control is retarded (delayed) with respect to the assist regeneration control or the reset regeneration control.

In the non-work regeneration control, the output of the engine 5 is limited to a parking time maximum output (for example, approximately 80 percent of the maximum output), which is lower than the maximum output. In this case, the rotational speed N of the engine 5 is maintained at the high idling rotational speed, so that the fuel injection amount of the common rail 341 is adjusted in such a manner as to suppress the torque T and reach the parking time maximum output.

Next, one example of the regeneration control of the exhaust filter 50 by means of the engine controller 311 will be described referring to flowcharts in FIGS. 14 and 15. Each regeneration control described above is executed by the engine controller 311 based on the commands of the meter controller 312. That is, algorithms (programs) illustrated in FIGS. 14 and 15 are stored in the ROM of the meter controller 312, and the algorithm is invoked in the RAM and processed by the CPU, and commands are transferred to the engine controller 311 via the CAN communication bus 315, and the engine controller 311 processes the commands of the meter controller 312, thereby executing each regeneration control described above.

As illustrated in FIG. 14, in the regeneration control of the exhaust filter 50, first, when the key switch 201 is turned on (S101: YES), the detection values of the engine rotation sensor 322, the coolant temperature sensor 323, the differential pressure sensor 325, and the DPF temperature sensor 326, and the opening degrees of the intake throttle member 78 and the EGR valve member 81, and the fuel injection amount of the common rail 341 are read (S102). That is, the engine controller 311 reads the detection values of the engine rotation sensor 322, the coolant temperature sensor 323, the differential pressure sensor 325, and the DPF temperature sensor 326, and the opening degrees of the intake throttle member 78 and the EGR valve member 81, and the fuel injection amount of the common rail 341 and transmits these to the meter controller 312.

Subsequently, when the cumulative drive time TI is less than the setting time TI1 (for example, 50 hours) after the execution of the reset regeneration control or the non-work regeneration control in the past (S103: NO), an amount of PM accumulation in the exhaust filter 50 is estimated (S104). The estimation of the amount of PM accumulation is performed by a P method based on the detection value of the differential pressure sensor 325 and an exhaust gas flow rate map and by a C method based on the detection value of the engine rotation sensor 322, the fuel injection amount, a PM emission map, and the exhaust gas flow rate map. When the amount of PM accumulation is equal to or higher than a prescribed amount Ma (e.g., 8 g/l) (S105: YES), the assist regeneration control is executed (S106). That is, the meter controller 312 provides a command signal to execute the assist regeneration control for the engine controller 311.

During the execution of the assist regeneration control, the amount of PM accumulation in the exhaust filter 50 is estimated based on the detection value of the engine rotation sensor 322, the fuel injection amount, the PM emission map, and the exhaust gas flow rate map (S107). When the amount of PM accumulation is less than the prescribed amount Ma (e.g., 6 g/l) (S108: YES), the assist regeneration control is finished, and the normal operation control is returned. When the amount of PM accumulation is equal to or higher than the prescribed amount Ma (S108: NO), and a predetermined time TI4 (e.g., 10 minutes) has passed in this state (S109: YES), the processing proceeds to Step S201, which is a reset waiting mode prior to the reset regeneration control.

Returning to Step S103, when the cumulative drive time TI is equal to or higher than the setting time TI1 (S103: YES), the processing proceeds to Step S201, which is the reset waiting mode, and a reset regeneration request is executed. In this stage, the regeneration lamp 332 and the regeneration switch lamp 345 flicker at a low speed (e.g., 0.5 Hz), and the warning buzzer 331 intermittently sounds at a low speed (e.g., 0.5 Hz). In this time, the meter controller 312 simultaneously causes the regeneration lamp 332 to flicker at a low speed and the warning buzzer 331 to sound at a low speed. Also, the work machine controller 314 receives the command signal from the meter controller 312 via the CAN communication bus 315, regarding the command signal, and causes the regeneration switch lamp 345 to flicker at a low speed.

Thus, in Step S201, the meter controller 312 makes the reset regeneration request, thereby driving the warning buzzer 331, the regeneration lamp 332, and the regeneration switch lamp 345 respectively. In this time, the flickering frequencies of the regeneration lamp 332 and the regeneration switch lamp 345 are synchronized. In the present embodiment, as illustrated in the constitution of FIG. 6, the flickering of the display lamp 264a of the meter panel 246 is displayed, and concurrently the regeneration switch lamp 345 incorporated in the regeneration switch 329 in the vicinity of the display lamp 264a is flickered. Accordingly, the operator can instantly verify the position of the regeneration switch 329, which is required to perform manual operation, according to regeneration control request warnings based on respective drives of the warning buzzer 331, the regeneration lamp 332, and the regeneration switch lamp 345.

Also, in Step S201, the meter controller 312 switches the screen display of the liquid crystal display panel 330 to the display based on the reset regeneration request information, which urges the execution of the reset regeneration control, thereby displaying an operating instruction indicator, for example, such as character data representing "Please keep the regeneration switch pressed down" on the liquid crystal display panel 330. In this time, it means that the screen display of the liquid crystal display panel 330 is returned from the reset regeneration request information to normal information (display information during normal operations) through the operation of the display switching switch 231. Herein, when the display switching switch 231 is operated without turning on the regeneration switch 329 in a state where the reset regeneration request information is displayed on the liquid crystal display panel 330, the screen display of the liquid crystal display panel 330 is alternately changed between the normal information and the reset regeneration request information at a predetermined timing (e.g., for every two seconds). When the reset regeneration control is required, the operator can verify both normal information and reset regeneration request information, which provides consideration in such a manner as to have no difficulty of manipulating the tractor during travelling on the road or during agricultural work.

When the regeneration switch 329 is turned on for a predetermined period of time (e.g., three seconds) (S202: YES), the reset regeneration control is executed (S203). In this stage, the regeneration lamp 332 and the regeneration switch lamp 345 are flickered while the sound of the warning buzzer 331 is stopped. Also, the screen display of the liquid crystal display panel 330 is changed from the reset regeneration request information to reset regeneration execution information according to a notification indicator such as character data representing "under reset regeneration". Accordingly, the operator can verify the display content of the meter panel 246 and a state of the regeneration lamp 332, so that the operator can easily visually recognize that the reset regeneration control is under execution, and the operator's attention can be awakened. It is noted that, regarding the screen display of the liquid crystal display panel 330, the screen display of the liquid crystal display panel 330 is returned from the reset regeneration execution information to the normal information by operating the display switching switch 231.

The amount of PM accumulation in the exhaust filter 50 is estimated during the execution of the reset regeneration control (S204), and when the amount of PM accumulation is in a state of being less than the prescribed amount Mr (e.g., 10 g/l) (S205: NO), and when a predetermined time TI8 (e.g., 30 minutes) has passed from the start of the reset regeneration control (S206: YES), the reset regeneration control is finished, and the normal operation control is returned. In this time, the regeneration lamp 332 and the regeneration switch lamp 345 are turned off so as to finish the reset regeneration control. Also, the screen display of the liquid crystal display panel 330 is changed from the reset regeneration execution information to the normal information. In contrast, when the amount of PM accumulation is equal to or higher than the prescribed amount Mr (S205: YES), it is regarded that the reset regeneration control fails, and there is apprehension that the PMs might be excessively accumulated, so that the processing proceeds to Step S301, which is a parking waiting mode prior to the non-work regeneration control.

As illustrated in FIG. 15, in the parking waiting mode, first, the amount of PM accumulation in the exhaust filter 50 is estimated (S301). Then, when the amount of PM accumulation is less than a prescribed amount Mb (e.g., 12 g/l) (S302: NO) and within a predetermined time TI9 (e.g., 10 hours) (S303: NO), a first non-work regeneration request is executed (S304). In this stage, the regeneration lamp 332 remains off, but the warning buzzer 331 intermittently sounds at a high speed (e.g., 1.0 Hz). Then, the screen display of the liquid crystal display panel 330 is switched to the display of a first non-work regeneration request indicator that notifies in advance the execution of the non-work regeneration control. The first non-work regeneration request indicator, for example, alternately switches the displays of the character data representing "Stop agricultural work portion" and the character data representing "Park the vehicle at safe places".

In contrast, when the amount of PM accumulation is equal to or higher than the prescribed amount Mb (S302: YES), or when the predetermined time TI9 (e.g., 10 hours) has passed while the parking waiting mode is held (S303: YES), there is apprehension that the PMs might be excessively accumulated, so that the abnormality of the exhaust filter 50 is notified (STEP 401). In this time, the regeneration lamp 332 flickers at a high speed (e.g., 1.0 Hz), and the warning buzzer 331 sounds at a high speed (e.g., 1.0 Hz). Also, the screen display of the liquid crystal display panel 330 is switched to the display of an abnormality warning indicator that alternately changes the character data representing "abnormality of exhaust filter" with the character data representing "Make contact with distributor".

After the execution of the first non-work regeneration request in the aforementioned Step S304, the processing is on standby until non-work regeneration transfer conditions (interlock release conditions) set in advance are established (S305). The non-work regeneration transfer conditions illustrated in Step S305 are made up of conditions such as the neutral position of the forward/backward potentiometer 211 (the neutral state of the forward/backward switching lever 252), the On state of the parking brake switch 236 (locked state with the parking brake lever 254), the Off state of the PTO clutch switch 225, the low idling rotational speed of the engine 5 (the minimum rotational speed during no load running), and the detection value of the coolant temperature sensor 323, which is equal to or higher than a predetermined value (e.g., 65 degrees Celsius) (the completion of the warming-up of the engine 5).

In Step S305, the non-work regeneration transfer conditions (interlock release conditions) are established (YES), a second non-work regeneration request is executed (S306). In this stage, the regeneration lamp 332 and the regeneration switch lamp 345 flicker at a low speed, and the warning buzzer 331 is switched to the intermittent low-speed sound. Also, the screen display of the liquid crystal display panel 330 is changed to the display based on second non-work regeneration request information, which urges the execution of the non-work regeneration control. That is, on the liquid crystal display panel 330, as is the same with the display based on the reset regeneration request information in Step S201, the operating instruction indicator such as character data representing "Please keep the regeneration switch pressed down" is displayed.

Thus, in Step S306, the meter controller 312 makes the second non-work regeneration request, thereby driving the warning buzzer 331, the regeneration lamp 332, and the regeneration switch lamp 345 respectively. In this time, the flickering frequencies of the regeneration lamp 332 and the regeneration switch lamp 345 are synchronized. In the present embodiment, as illustrated in the constitution of FIG. 6, the flickering of the display lamp 264*a* of the meter panel 246 is displayed, and concurrently the regeneration switch lamp 345 incorporated in the regeneration switch 329 in the vicinity of the display lamp 264*a* is flickered. Accordingly, concurrently with the recognition of the establishment of the non-work regeneration transfer conditions (interlock release conditions), the operator can instantly verify the position of the regeneration switch 329, which is required to perform manual operation, according to regeneration control request warnings based on respective drives of the warning buzzer 331, the regeneration lamp 332, and the regeneration switch lamp 345.

Then, when the regeneration switch 329 is turned on for a predetermined period of time (S307: YES), the non-work regeneration control is executed (S308). In this stage, the regeneration lamp 332 and the regeneration switch lamp 345 are lighted up, whereas the sound of the warning buzzer 331 is stopped. Also, the screen display of the liquid crystal display panel 330 is changed from the second non-work display regeneration request information to non-work regeneration execution information. That is, on the screen display of the liquid crystal display panel 330, a non-work regeneration notification indicator that alternately switches the character data representing "exhaust filter is under regeneration" and the character data representing "Wait until regeneration is completed" is displayed. That is, it is configured to provide the display to the extent that the operation of the main machine is prohibited until the regeneration control is completed, so that the operational errors of the operator can be prevented beforehand.

During the execution of the non-work regeneration control, the amount of PM accumulation in the exhaust filter 50 is estimated (S309). When the amount of PM accumulation is less than a prescribed amount Ms (e.g., 8 g/l) (S310: YES), and when a predetermined time TI11 (e.g., 30 minutes) has passed from the start of the non-work regeneration control (S311: YES), the non-work regeneration control is finished, and the normal operation control is returned. When the amount of PM accumulation is equal to or higher than the prescribed amount Ms (S310: NO), and when a predetermined time TI12 (e.g., 30 minutes) has passed in this state (S312: YES), it is regarded that the non-work regeneration control fails, and there is apprehension that the PMs might be excessively accumulated, so that the processing proceeds to Step S401, in which the abnormality of the exhaust filter 50 is notified.

When the non-work regeneration transfer conditions (interlock release conditions) are brought into a non-valid state during the execution of the non-work regeneration control due to the release of a locked state by means of the parking brake lever 254, and the like (S313: YES), and after the non-work regeneration control is interrupted (S314), the processing proceeds to Step S304, and the first non-work regeneration request is executed. It is noted that, in S312, it has been determined whether or not the non-work regeneration control is interrupted based on the non-valid state of the non-work regeneration transfer conditions (interlock release conditions), but it may be such that when the regeneration switch 329 is pressed down during the execution of the non-work regeneration control, the non-work regeneration control is interrupted. Accordingly, the non-work regeneration control of the exhaust filter 50 can be interrupted without carrying out troublesome operations, such as an operation in which the engine 5 is stopped, and the non-work regeneration control of the exhaust filter 50 is interrupted.

As described above, in the present embodiment, when the cumulative drive time of the engine 5 has passed in a prescribed time or longer, the meter controller 312 makes a regeneration control request for the reset regeneration, and the regeneration control request warning is displayed on the meter panel 246. Only when the operator manually operates the regeneration switch 329 based on the regeneration control request warning of the meter panel 246, the regeneration control of the exhaust filter (the exhaust gas purification device) 50 is started. Accordingly, the regeneration control operation of the engine 5 is executed by the manual operation of the operator, and the exhaust filter 50 is appropriately regenerated. That is, the engine 5 can be prevented from being automatically controlled unwillingly against an operator's will, and the driving trouble of the engine 5 or the agricultural portion can be suppressed.

Also, the start of the regeneration control of the exhaust filter 50, which is instructed by the manual operation of the operator, is made based on the operation in which the regeneration switch 329 is kept pressed down (ON operation for a predetermined period of time (e.g., three seconds)). That is, it is constituted that when the regeneration switch 329 is successively operated for a longer period of time than an operating time during which it can be determined whether the operation for the regeneration switch 329 is based on the manual operation of the operator or based on the operational errors, the start of the regeneration control of the exhaust filter 50 is started. Accordingly, the operation of the regeneration control that the operator does not expect can be prevented beforehand.

Also, the engine controller 311 for controlling the drive of the engine 5 and the meter controller 312 for controlling the display operation of each display portion (the regeneration lamp 332 or the liquid crystal display panel 330) of the meter panel 246 are included, and the engine controller 311 and the meter controller 312 are electrically connected to each other. Then, after the meter panel 246 displays the regeneration control request warning, only when the meter controller 312 verifies the reception of the manual operation by means of the regeneration switch 329, the meter controller 312 provides the command of the execution of the regeneration control of the exhaust filter 50 for the engine controller 311.

Furthermore, when the operator operates and turns off the key switch, stops the engine 5 during the regeneration control of the exhaust filter 50, and subsequently restarts the engine 5, the regeneration control of the exhaust filter 50 is configured to be reset, so that the operation of the regeneration control that the operator does not expect can be prevented beforehand.

During the operation of the regeneration control as described above, the meter controller 312 displays the character data on the liquid crystal display panel 330 of the meter panel 246, notifies the operator of the state of the operation, and urges the operator to carry out necessary operations. In particular, when the non-work regeneration control is executed, it is required to maintain the rotational speed N of the engine 5 at the high idling rotational speed (the maximum rotational speed, e.g., 2200 rpm), and the output of the engine 5 is limited to the parking maximum output (for example, approximately 80 percent of the maximum output), which is lower than the maximum output. Accordingly, it is preferable that when the non-work regeneration transfer conditions made up of a plurality of conditions are not satisfied, the non-work regeneration control is set in such a manner as not to be executed, and insufficient conditions are informed to the operator by use of display of the character data on the liquid crystal display panel 330, and necessary operations are indicated.

Figure 16:
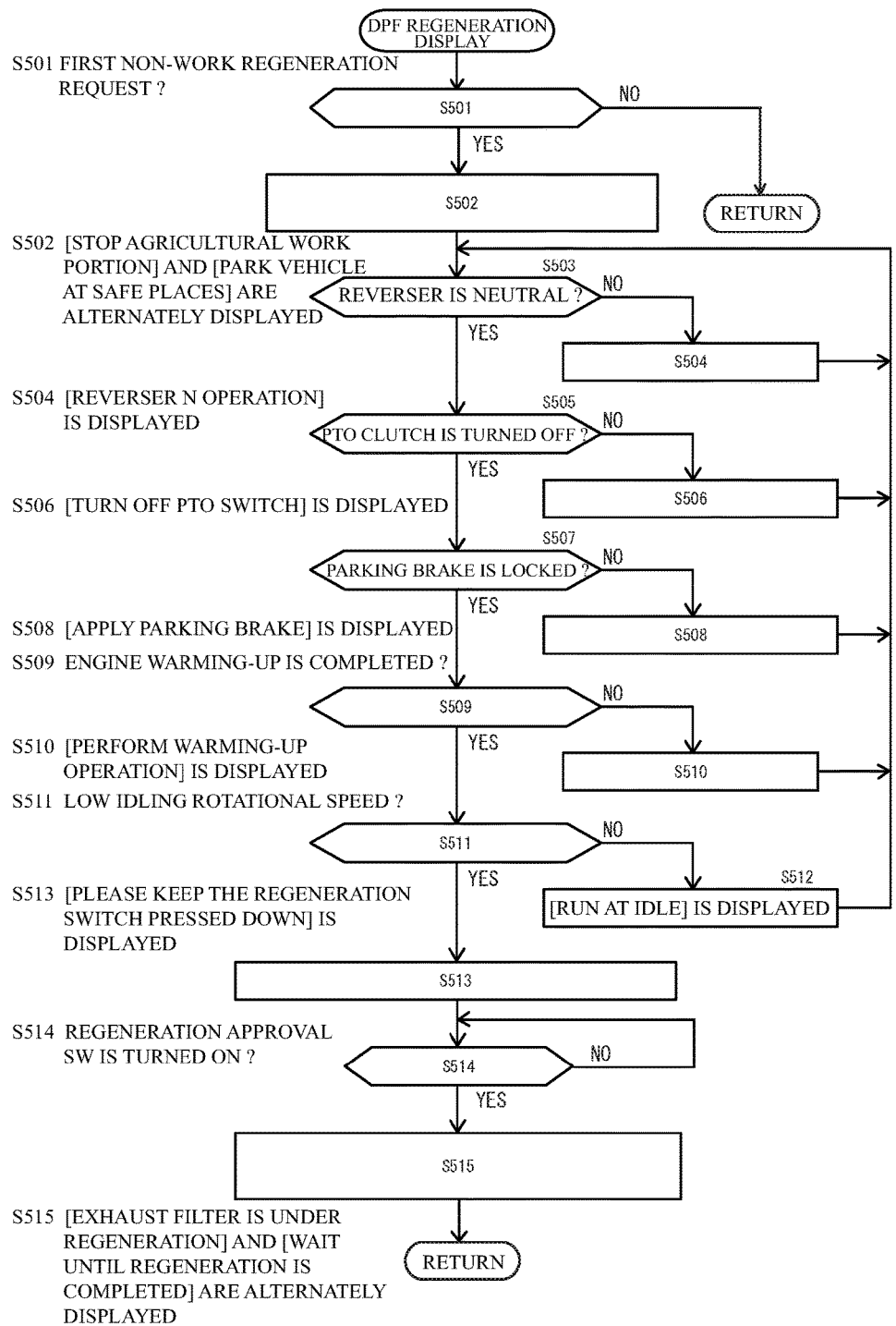
FIG. 16 is a flowchart illustrating the timing of displaying characters during the non-work regeneration control.

The display operation of the liquid crystal display panel 330 in the case where the non-work regeneration control is executed will be described below referring to a flowchart in FIG. 16. When the meter controller 312 executes the first non-work regeneration request at Step S304 above (S501: YES), the meter controller 312 causes the liquid crystal display panel 330 to display a first non-work regeneration request indicator that alternately switches and displays the character data representing "Stop agricultural work portion" and the character data representing "Park the vehicle at safe places" (S502). Then, the meter controller 312 communicates with the main machine controller 313 and verifies whether or not the forward/backward switching lever 252 is in a neutral state based on a signal from the forward/backward potentiometer 211 (S503). When the forward/backward switching lever 252 is disposed on the side of the forward movement or the side of the rearward movement (S503: NO), in order to urge the operator to bring the forward/backward switching lever 252 into a neutral state, the meter controller 312 causes the liquid crystal display panel 330 to display an operating indicator of the character data representing "Put a reverser in a neutral state" (S504).

Subsequently, the meter controller 312 communicates with the work machine controller 314 and verifies whether or not the PTO clutch switch 225 is in an OFF state based on a signal from the PTO clutch switch 225 (S505). When the PTO clutch switch 225 is in an ON state (S505: NO), the meter controller 312 causes the liquid crystal display panel 330 to display the operating indicator of the character data representing "Turn off the PTO switch", in order to urge the operator to turn off the PTO clutch switch 225 (S506).

Subsequently, the meter controller 312 communicates with the main machine controller 313 and verifies whether or not the lock state is brought by the parking brake lever 254 based on a signal from the parking brake switch 236 (S507). When the parking brake switch 236 is in an OFF state (S507: NO), the meter controller 312 causes the liquid crystal display panel 330 to display the operating indicator of the character data representing "Apply the parking brake", in order to urge the operator to bring about the lock state by use of the parking brake lever 254 (S508).

Subsequently, the meter controller 312 communicates with the engine controller 311 and verifies whether or not the warming-up operation is completed based on a signal from the coolant temperature sensor 323 (S509). When a detection value detected by the coolant temperature sensor 323 is lower than a predetermined value (e.g., 65 degrees Celsius) (S509: NO), the meter controller 312 causes the liquid crystal display panel 330 to display the operating indicator of the character data representing "Perform the warming-up operation", in order to urge the operator to complete the warming-up operation (S510).

Subsequently, the meter controller 312 communicates with the engine controller 311 and verifies whether or not the engine 5 is at the low idling rotational speed based on a signal from the engine rotation sensor 322 (S511). When the engine 5 does not operate at the low idling rotational speed (S511: NO), the meter controller 312 causes the liquid crystal display panel 330 to display the operating indicator of the character data representing "Run at idle", in order to urge the operator to let the engine 5 operate at the low idling (S512). When the whole conditions of respective Steps S503, S505, S507, S509, and S511 are satisfied, which establishes the non-work regeneration transfer conditions, the meter controller 312 executes the second non-work regeneration request at Step S306 described above and causes the liquid crystal display panel 330 to display the operating indicator of the character data representing "Please keep the regeneration switch pressed down" (S513).

Subsequently, as is the same with Step S307 described above, it is determined whether or not the operation of keeping the regeneration switch 329 pressed down is carried out (S514). In this time, when the regeneration switch 329 is turned on for a predetermined period of time (S514: YES), a non-work regeneration notification indicator that alternately switches the character data representing "exhaust filter is under regeneration" with the character data representing "Wait until regeneration is completed" is displayed on the liquid crystal display panel 330 (S515).

It is noted that the constitution of each portion of the present invention of the instant application is not limited to the embodiments illustrated, but various modifications can be applied without departing from the scope of the gist of the present invention of the instant application.

REFERENCE SIGNS LIST

5 Engine
50 Exhaust filter
225 PTO clutch switch
236 Parking brake switch
245 Steering column
246 Meter panel
261 Operational error preventing body
262 Meter cover
263 Dashboard
263a Meter installation surface
263b Switch installation surface
264a to 264d Switch
265 Engine tachometer
266a to 266d Display lamp
267a to 267d Display lamp
311 Engine controller
312 Meter controller
313 Main machine controller
314 Work machine controller
315 CAN communication bus
322 Engine rotation sensor

323 Coolant temperature sensor
324 Fuel temperature sensor
325 Differential pressure sensor
326 DPF temperature sensor
329 Regeneration switch
330 Liquid crystal display panel
331 Warning buzzer
332 Regeneration lamp
345 Regeneration switch lamp

The invention claimed is:

1. A work vehicle configured to include an engine mounted on a travelling machine body; a driving operation display device for displaying rotation speed of the engine and other information and instructions to an operator of the work vehicle; an exhaust gas purification device arranged in an exhaust gas path of the engine; a work device mounted on the travelling machine body; and a controller for executing regeneration control for removing particulate matter inside the exhaust gas purification device; a reset regeneration control configured to effect display on the driving operation display device of instructions to the operator to execute reset regeneration to increase exhaust gas temperature by post injection when regeneration control has not sufficiently removed particulate matter from inside the exhaust gas purification device; and a non-work regeneration control configured to effect, when regeneration and reset regeneration control have not sufficiently removed particulate matter from inside the exhaust gas purification device, display on the driving operation display device of information relating to non-work regeneration transfer conditions comprising the vehicle being in neutral and the parking brake being applied necessary to effect non-work regeneration and instructions to effect, provided the non-work regeneration transfer conditions have been satisfied, non-work regeneration in which post injection is effected while the engine is operated at maximum idle speed.

2. The work vehicle according to claim 1, wherein the displayed information relating to regeneration transfer conditions comprises indicia indicating any regeneration transfer condition not satisfied.

3. The work vehicle according to claim 2, wherein when the regeneration transfer conditions are satisfied, the driving operation display device displays indicia urging the operator to actuate the non-work regeneration.

4. The work vehicle according to claim 3, further comprising a manually operable regeneration switch for actuating the non-work regeneration, and wherein the displayed indicia effect the non-work regeneration comprise instructions to manually operate the regeneration switch.

* * * * *